United States Patent
Naito

(10) Patent No.: US 10,085,003 B2
(45) Date of Patent: Sep. 25, 2018

(54) IMAGE CAPTURE APPARATUS AND CONTROL METHOD FOR THE SAME

(71) Applicant: CANON KABUSHIKI KAISHA, Tokyo (JP)

(72) Inventor: Go Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 14/963,861

(22) Filed: Dec. 9, 2015

(65) Prior Publication Data
US 2016/0173856 A1   Jun. 16, 2016

(30) Foreign Application Priority Data
Dec. 12, 2014   (JP) .................................. 2014-252295

(51) Int. Cl.
| H04N 13/00 | (2018.01) |
| H04N 13/02 | (2006.01) |
| G06T 7/571 | (2017.01) |
| G06T 7/557 | (2017.01) |
| G01C 3/32  | (2006.01) |

(52) U.S. Cl.
CPC .......... *H04N 13/0271* (2013.01); *G01C 3/32* (2013.01); *G06T 7/557* (2017.01); *G06T 7/571* (2017.01); *H04N 13/0217* (2013.01); *H04N 13/0228* (2013.01); *G06T 2200/24* (2013.01); *H04N 2013/0081* (2013.01)

(58) Field of Classification Search
CPC ....... H04N 2013/0081; H04N 13/0217; H04N 13/0228; H04N 13/0271; G01C 3/32; G06T 7/557; G06T 2200/24; G06T 7/571
See application file for complete search history.

(56) References Cited

U.S. PATENT DOCUMENTS

| 5,436,738 A * | 7/1995 | Manico ............... G02B 27/2214 355/22 |
| 5,806,005 A * | 9/1998 | Hull .................... H04N 1/00212 348/14.12 |
| 2009/0067041 A1 * | 3/2009 | Izumi ..................... G02B 13/14 359/356 |

(Continued)

FOREIGN PATENT DOCUMENTS

| JP | 11-207568 A | 8/1999 |
| JP | 2003-083727 A | 3/2003 |

(Continued)

OTHER PUBLICATIONS

The above foreign patent documents were cited in the Aug. 13, 2018 Japanese Office Action, which is enclosed without an English Translation, that issued in Japanese Patent Application No. 2014-252295.

*Primary Examiner* — Zhihan Zhou
(74) *Attorney, Agent, or Firm* — Cowan, Liebowitz & Latman, P.C.

(57) ABSTRACT

An image capture apparatus that can aid in the generation of desired three-dimensional data, and a control method for the same are provided. Based on parallax images obtained by using an image sensor, three-dimensional information of a subject included in the parallax images is obtained. A comparison is made between a resolution of the three-dimensional information set and a resolution of a predetermined formative apparatus, and whether or not recapturing is required is judged.

11 Claims, 17 Drawing Sheets

(56) References Cited

U.S. PATENT DOCUMENTS

| | | | | |
|---|---|---|---|---|
| 2009/0086063 A1* | 4/2009 | Suzuki | ............. | H01L 27/14603 348/241 |
| 2010/0086293 A1* | 4/2010 | Iwane | ..................... | G03B 3/00 396/91 |
| 2011/0122386 A1* | 5/2011 | Jones | ..................... | G03B 27/54 355/67 |
| 2011/0134497 A1* | 6/2011 | Horimai | .................. | G03H 1/30 359/11 |
| 2012/0300095 A1* | 11/2012 | Sawada | ................ | H04N 5/2258 348/222.1 |
| 2013/0194482 A1* | 8/2013 | Nicol | .................. | H04N 5/2254 348/340 |
| 2016/0360160 A1* | 12/2016 | Eizenberg | .......... | G06Q 30/0207 |
| 2017/0223228 A1* | 8/2017 | Shaw | ....................... | G06T 3/40 358/1.2 |

FOREIGN PATENT DOCUMENTS

| | | |
|---|---|---|
| JP | 2004-122501 A | 4/2004 |
| JP | 2011-085971 A | 4/2011 |
| JP | 2013-236160 A | 11/2013 |

* cited by examiner

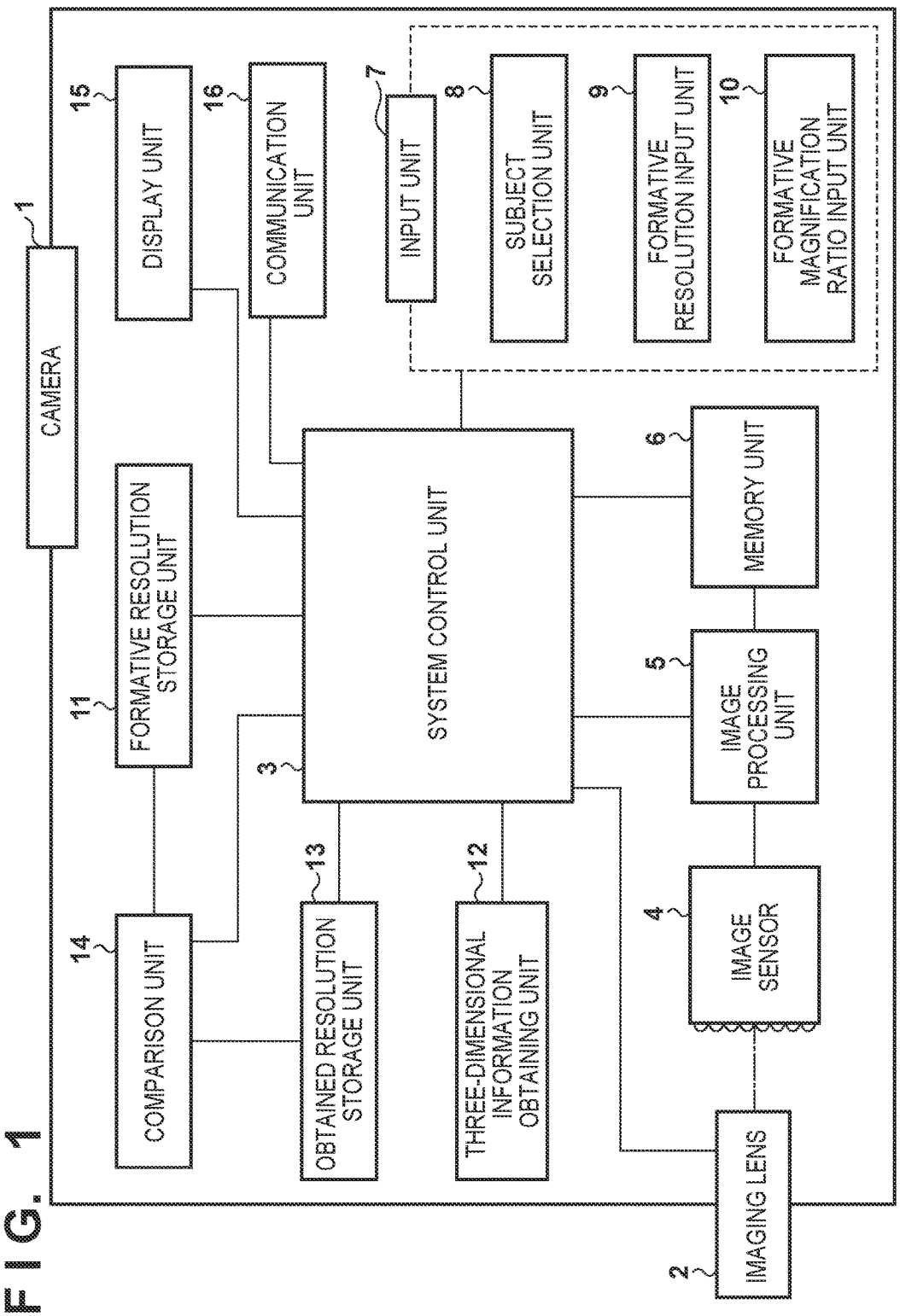

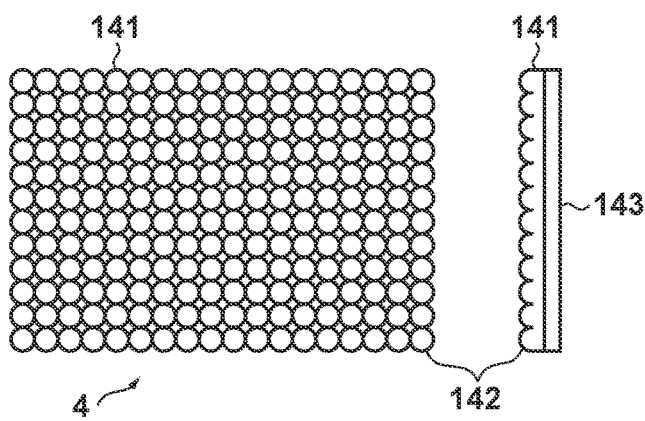
FIG. 2A
FIG. 2B
FIG. 2C
FIG. 2D
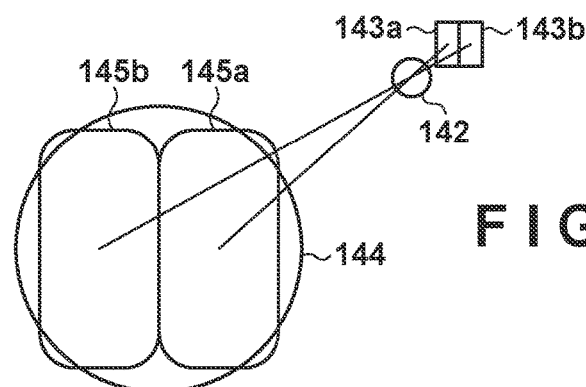
FIG. 2E  FIG. 2F  FIG. 2G
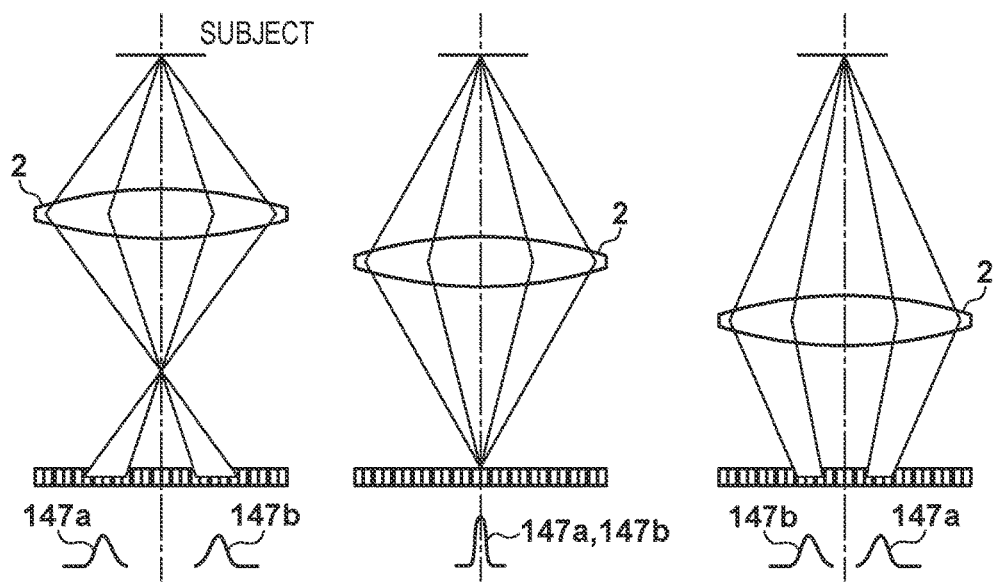

FIG. 4A
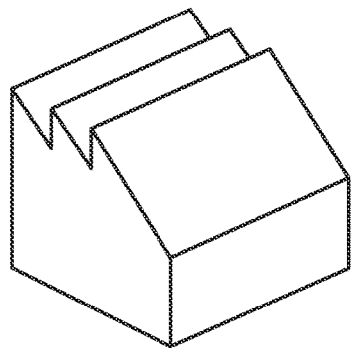
IMAGE CAPTURING → FIG. 4B
IMAGE CAPTURING → FIG. 4C
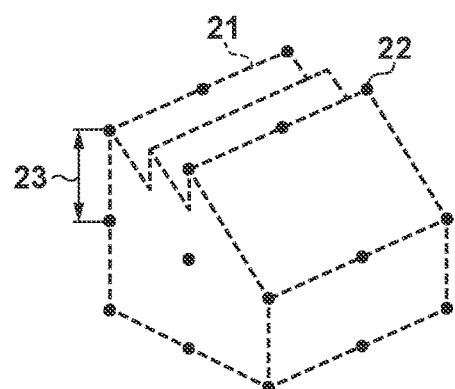
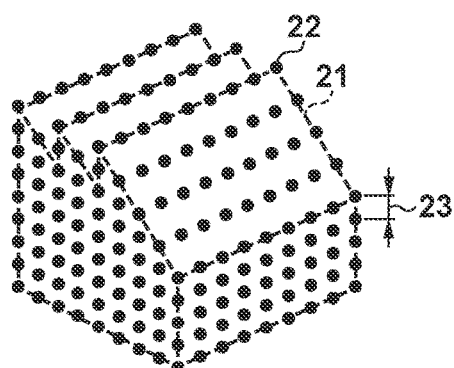
3D OBJECT FORMATION ↓
3D OBJECT FORMATION ↓
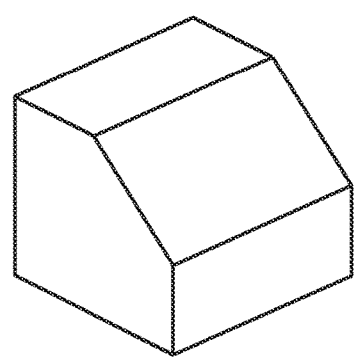
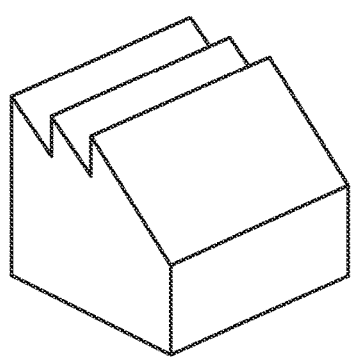
FIG. 4D
FIG. 4E FIG. 6A
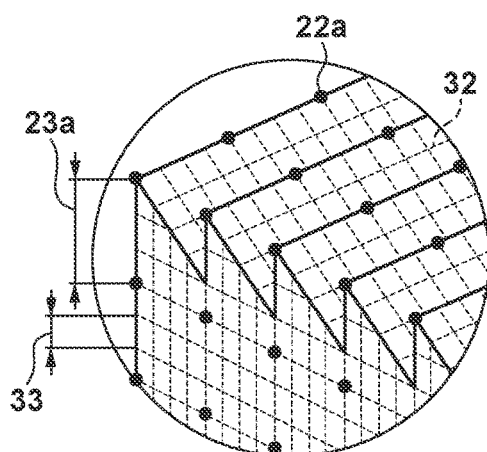
FIG. 6B
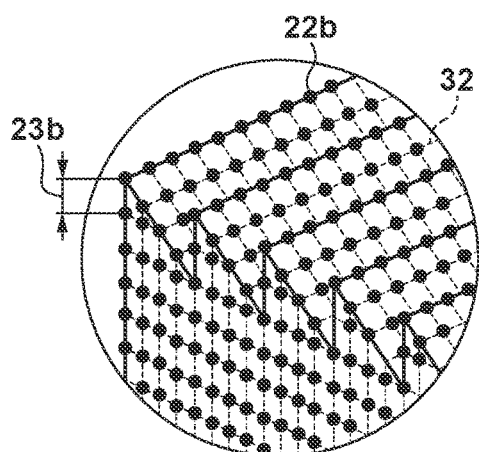
↓ 3D OBJECT FORMATION
↓ 3D OBJECT FORMATION
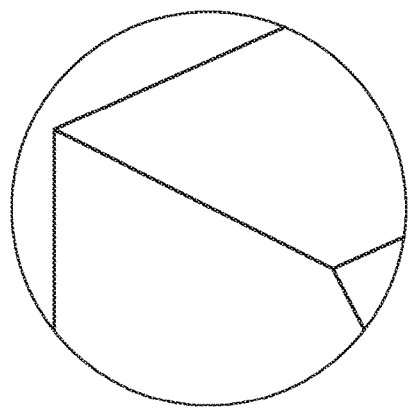
FIG. 6C
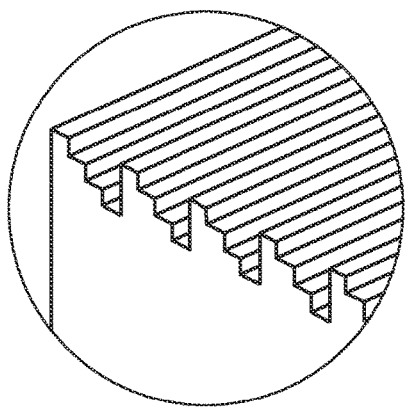
FIG. 6D

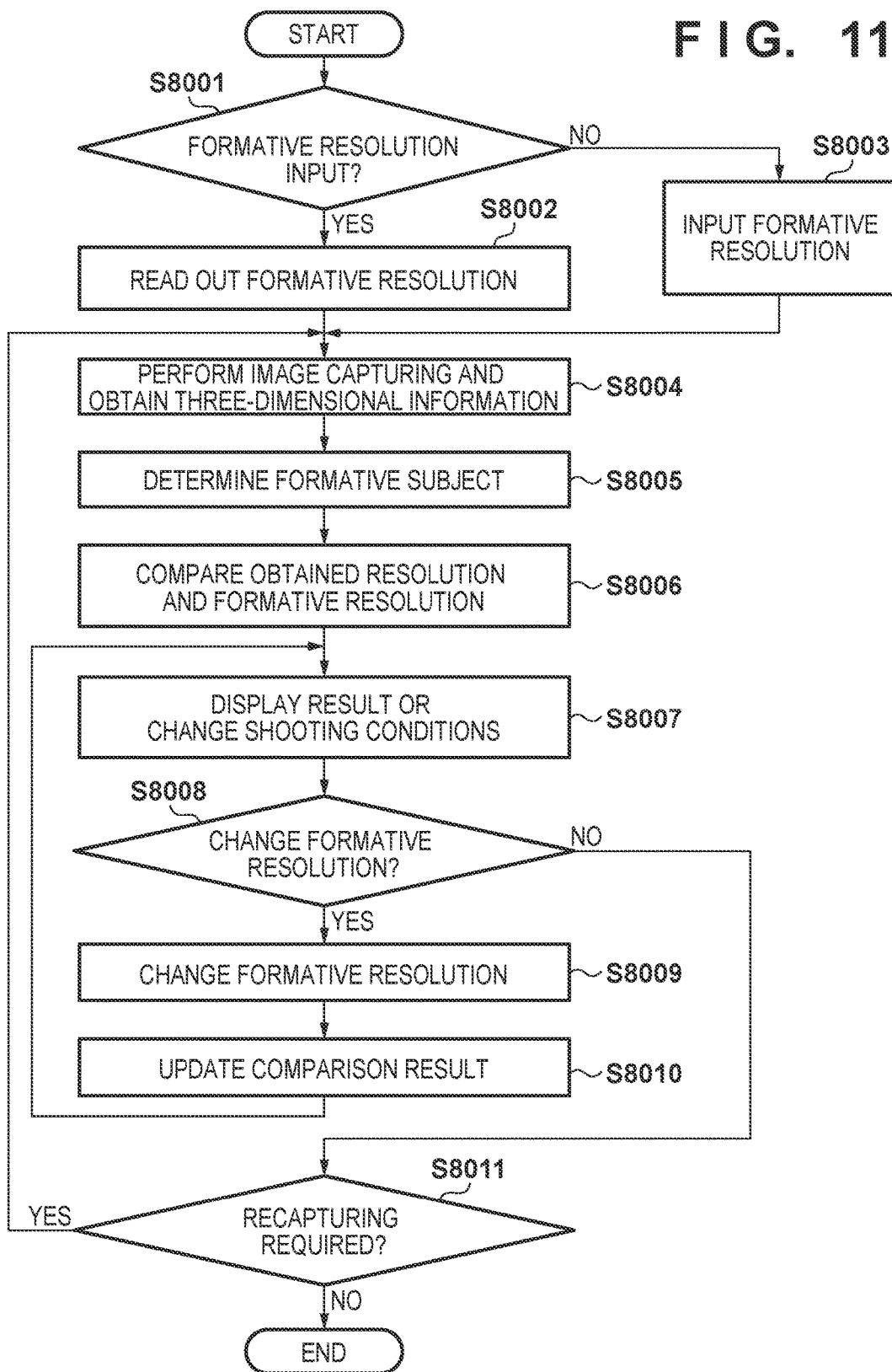

IMAGE CAPTURE APPARATUS AND CONTROL METHOD FOR THE SAME

BACKGROUND OF THE INVENTION

Field of the Invention

The present invention relates to an image capture apparatus and a control method for the same, and in particular to an image capture apparatus that is capable of obtaining three-dimensional information of a subject and a control method for the same.

Description of the Related Art

There is a conventionally known system that estimates the three-dimensional coordinate points of a subject based on the same feature point included in a plurality of images, which have been obtained by capturing the same subject from different positions, and information about the position and the orientation of the camera that has captured each image (Japanese Patent Laid-Open No. 2011-85971).

Also, in recent years, there have been known formative apparatuses called 3D printers, which are for forming three-dimensional objects, and Japanese Patent Laid-Open No. 2004-122501 discloses an optical formative apparatus that forms a three-dimensional object by layering cured resin layers, which are each made by curing a light-curing resin by exposing it to light.

In the case of forming a three-dimensional object with a formative apparatus as disclosed in Japanese Patent Laid-Open No. 2004-122501 by using the subject's three-dimensional coordinate data (three-dimensional data) obtained by a method as disclosed in Japanese Patent Laid-Open No. 2011-85971, the difference between the resolution of the three-dimensional data and the resolution of the formative apparatus is a matter to be considered.

When the resolution of the three-dimensional data is lower than the resolution of the formative apparatus, it is not possible to fully take advantage of the capabilities of the formative apparatus. On the other hand, when the resolution of the three-dimensional data is higher than the resolution of the formative apparatus, the formative apparatus can obtain, from the three-dimensional data, only an object formed with a low degree of reproducibility, and wastes its resources such as a storage capacity and a processing capacity by processing an unnecessarily large amount of three-dimensional data.

It is therefore desirable to generate three-dimensional data with a resolution that is suited to a formative apparatus. However, no configuration for solving such a problem has been proposed.

SUMMARY OF THE INVENTION

Considering the problems above, the present invention provides an image capture apparatus that can aid in the generation of desired three-dimensional data, and a control method for the same.

According to one aspect of the present invention, there is provided an image capture apparatus, comprising: an image sensor; an obtaining unit configured to obtain three-dimensional information of a subject, the three-dimensional information including an image obtained by using the image sensor, and depth information relating to the image; a comparison unit configured to make a comparison between a resolution of the three-dimensional information and a predetermined resolution; and a judging unit configured to judge whether or not recapturing of the subject is required, based on a result of the comparison.

According to another aspect of the present invention, there is provided an image capture apparatus, comprising: an image sensor; an obtaining unit configured to obtain three-dimensional information of a subject, the three-dimensional information including an image obtained by using the image sensor and depth information corresponding to the image; a calculation unit configured to calculate a required resolution based on a resolution of the three-dimensional information; and a notification unit configured to notify a user of the calculated resolution or information of a formative apparatus that supports the calculated resolution.

According to still another aspect of the present invention, there is provided an image capture apparatus control method, comprising: obtaining, based on parallax images obtained by using an image sensor, three-dimensional information of a subject included in the parallax images; making a comparison between a resolution of the three-dimensional information and a resolution of a predetermined formative apparatus; and judging whether or not recapturing is required, based on a result of the comparison.

According to yet another aspect of the present invention, there is provided an image capture apparatus control method, comprising: obtaining three-dimensional information of a subject, the three-dimensional information including an image obtained by using an image sensor, and depth information relating to the image; making a comparison between a resolution of the three-dimensional information and a predetermined resolution; and judging whether or not recapturing of the subject is required, based on a result of the comparison.

Further features of the present invention will become apparent from the following description of exemplary embodiments with reference to the attached drawings.

BRIEF DESCRIPTION OF THE DRAWINGS

FIG. 1 is a block diagram showing an example of a functional configuration of a camera according to a first embodiment of the present invention.

FIG. 2A to FIG. 2G are diagrams illustrating an example of a configuration of an image sensor according to the first embodiment.

FIG. 4A to FIG. 4E are diagrams illustrating the influence that the difference between an obtained resolution and a formative resolution has upon an object to be formed.

FIG. 6A to FIG. 6D are diagrams illustrating the influence of the difference between the obtained resolution and the formative resolution has upon an object to be formed.

FIG. 11 is a flowchart showing three-dimensional information obtaining operations according to the first embodiment.

DESCRIPTION OF THE EMBODIMENTS

Figure 3A:
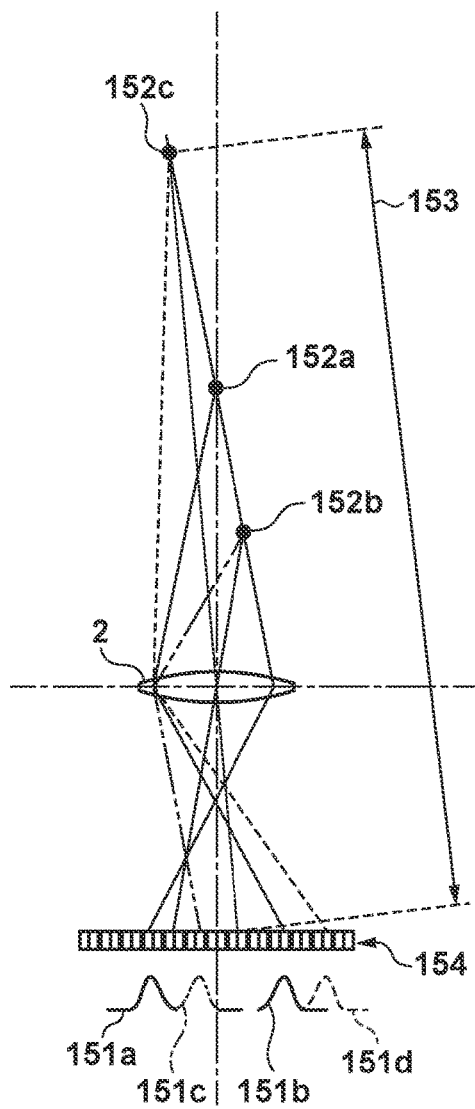
FIG. 3A and FIG. 3B are diagrams illustrating a method for calculating a subject distance according to the first embodiment.

Exemplary embodiments of the present invention will now be described in detail in accordance with the accompanying drawings.

First Embodiment

FIG. 1 is a block diagram showing an example of a functional configuration of a digital camera (hereinafter simply referred to as camera) 1, which is an example of an image capture apparatus according to a first embodiment of the present invention. Note that the present invention can be applied not only to electronic devices that mainly provide an image capture function, such as cameras, but also to any electronic devices that have a built-in camera or that can be connected to a camera.

In FIG. 1, the camera 1 is provided with an imaging lens (imaging optical system) 2 having a focus lens and so on. The imaging lens 2 may be an interchangeable lens that is attachable to and detachable from the camera 1. A system control unit 3 has, for example, a non-volatile memory, a volatile memory, and a programmable processor, and controls each unit by deploying programs stored in the non-volatile memory to the volatile memory and executing the programs with the processor, thereby achieving the operations of the camera 1.

An image sensor 4 has a configuration in which a plurality of pixels each having a photoelectric conversion function are arrayed, and converts the subject's image formed on an imaging surface by the imaging lens 2 into an electrical signal (image signal). As described below, each pixel of the image sensor 4 has a plurality of photoelectric conversion areas, and the image sensor 4 is configured to be able to obtain a plurality of parallax images by performing image capturing (exposure) a single time. An image processing unit 5 applies various kinds of image processing to, for example, image signals generated by the image sensor 4 and signals read out from a memory unit 6. Examples of image processing applied by the image processing unit 5 include, but are not limited to, white balance adjustment processing, color complement processing, gamma correction processing, encoding processing, and decoding processing.

The memory unit 6 has, for example, at least either a non-volatile memory or a volatile memory, and is used for, for example, temporarily storing data and saving various kinds of setting values or the likes. Note that at least some of the programs executed by the system control unit 3 may be stored in the memory unit 6, and the memory unit 6 may be used as a work area for the system control unit 3. Note that the memory unit 6 may include a detachable storage medium, and an interface and a peripheral circuit for writing data to the storage medium and reading out data from the storage medium.

An input unit 7 is a user interface for the user to input various kinds of instructions and data to the camera 1. The input unit 7 may include not only input devices that are physically operated, such as keys, buttons, switches, and a touch panel, but also a configuration supporting non-contact input methods such as a voice input method.

The input unit 7 is provided with a subject selection unit 8 for selecting, from a captured image, a subject from which a three-dimensional object is to be formed, a formative resolution input unit 9 for inputting a formative resolution, and a formative magnification ratio input unit 10 for inputting a formative magnification ratio that is a ratio of a size of three-dimensional object to that of the subject from which the three-dimensional object is to be formed. These units may be configured as dedicated input devices, but may be realized with, for example, a combination of operations using general-purpose input devices included in the input unit 7, and GUI display.

Here, a formative resolution indicates the degree of detail with which the formative apparatus that is assumed to be used can form a three-dimensional object. For example, when the apparatus can form a three-dimensional object with a pitch of 0.02 mm, the formative resolution is 0.02 mm. The formative resolution may be input by directly inputting a value, or by another method such as inputting an apparatus model number. If this is the case, with respect to several apparatuses, pieces of information identifying the apparatuses (e.g., the model numbers of the apparatuses) and the respective formative resolutions of the apparatuses are associated with each other and stored in the memory unit 6. The system control unit 3 can obtain the formative resolution by referring to the memory unit 6 by using the model number input from the input unit 7. The system control unit 3 stores the input formative resolution or the obtained formative resolution to a formative resolution storage unit 11.

The formative magnification ratio is a value indicating the size of an object to be formed relative to the actual size of the subject. In the case where the subject is not to be deformed, a magnification ratio with respect to only one direction out of the x, y, and z directions may be specified. For example, when ×2 is specified, the object to be formed has eight times (=2^3) the size of the actual subject. Of course, a configuration may be adopted in which the magnification ratio for the volume is specified.

Alternatively, the magnification ratio may be automatically set when the camera is activated or when the subject from which an object is formed is determined. Examples of the method for automatically determining the formative magnification ratio include a method for calculating, as the formative magnification ratio, the magnification ratio in the case of generating the largest object based on the actual size of the subject and the maximum object size that the formative apparatus to be used can form. Alternatively, the formative magnification ratio may be calculated by using the size of the object to be formed input by the user (e.g., "within 100×100×100 mm"), instead of the maximum object size that the formative apparatus can form.

A three-dimensional information obtaining unit 12 obtains three-dimensional information of the subject from the image captured by the image sensor 4. An obtained resolution storage unit 13 stores the resolution of the three-dimensional information obtained by the three-dimensional information obtaining unit 12. The three-dimensional information of the subject according to the present embodiment is information in which the captured image (two-dimensional information), and distance information (depth information), which indicates the distance from the camera 1 to the subject, are combined.

A communication unit 16 is a communication interface between the camera 1 and an external device, and enables the camera 1 and the external device to communicate with each other by at least either wired communication or wireless communication. Data for object forming may be directly supplied from the camera 1 to the formative apparatus by, for example, connecting the formative apparatus with a cable or a wireless LAN via the communication unit 16.

As described above, the camera 1 according to the present embodiment can obtain a plurality of parallax images by performing image capturing (exposure) a single time. Various kinds of cameras, which are represented by multi-eye cameras such as stereo cameras, are known as examples of this kind of camera. According to the present embodiment, the image sensor 4 is provided with a microlens array (MLA), which divides the exit pupil of the imaging lens 2, on the light-receiving surface. The camera 1 can obtain the distance information (depth information) of the subject by detecting the phase difference between the plurality of parallax images obtained by such an image sensor 4. It is also possible to obtain the two-dimensional information of the subject by adding the parallax images. The detailed configuration of the image sensor 4 and the details of the method for obtaining the three-dimensional information of the subject from the parallax images are described later with reference to FIG. 2A to FIG. 2G and FIG. 3A and FIG. 3B.

The combination of the distance information of the subject obtained by the three-dimensional information obtaining unit 12 and the captured image (two-dimensional information) generated by the image processing unit 5 is stored as the three-dimensional information of the subject to the memory unit 6. Also, the resolution of the obtained three-dimensional information (hereinafter, "obtained resolution") is stored to the obtained resolution storage unit 13. The obtained resolution indicates the degree of detail of the three-dimensional information of the subject, and indicates the shortest distance between the three-dimensional coordinate points constituting the obtained three-dimensional information.

A comparison unit 14 makes a comparison between the formative resolution stored in the formative resolution storage unit 11 and the obtained resolution stored in the obtained resolution storage unit 13, and outputs the comparison result to the system control unit 3. Here, the resolution stored in the formative resolution storage unit 11, which is compared with the obtained resolution by the comparison unit 14, is not limited to a resolution that fully takes advantage of the specifications of the above-described formative apparatus, and may be a resolution with which the user attempts to perform output by using the formative apparatus. If this is the case, the formative resolution storage unit 11 stores the desired resolution set by the user. For example, in the case where the formative apparatus owned by the user can perform output with a resolution of 0.02 mm, but the user is satisfied to perform output with a resolution of 0.04 mm, a configuration may be adopted such that the user can set 0.04 mm as a user setting to the formative resolution storage unit 11.

The system control unit 3 judges whether or not the obtained resolution is sufficient for the formative resolution from the comparison result obtained by the comparison unit 14, and displays the judgement result to a display unit 15. The details of the judgment method as to whether or not the obtained resolution is sufficient are described later.

Next, a description is given of the method for obtaining the three-dimensional information of a subject according to the present embodiment. First, a description is given of an example of the configuration of the image sensor 4, with reference to FIG. 2A to FIG. 2D. FIG. 2A schematically shows the image sensor 4 viewed from the front side and a lateral side of the camera 1. An MLA 141 is formed on the light-receiving surface of a pixel group 143 of the image sensor 4. Each of the pixels constituting the pixel group 143 includes, as shown in FIG. 2B and FIG. 2C, one microlens 142 and two photodiodes (photoelectric conversion areas) 143a and 143b. Hereinafter, the photodiode 143a is referred to as A-image photodiode (A-pixel), and the photodiode 143b is referred to as B-image photodiode (B-pixel).

FIG. 2D is a conceptual diagram of an exit pupil 144 of the imaging lens 2, and the pair of an A-image pupil 145a and an A-pixel 143a and the pair of an B-image pupil 145b and a B-pixel 143b each have a conjugative relationship due to the microlens 142. Therefore, each pixel of the image sensor 4 has a pupil dividing function, and a luminous flux passing through the A-image pupil 145a, which is the right half of the exit pupil 144, is incident to the A-pixel 143a, and a luminous flux passing through the B-image pupil 145b, which is the left half of the exit pupil 144, is incident to the B-pixel 143b. Therefore, an image composed of a group of A-pixels and an image composed of a group of B-pixels are parallax images.

The defocus amount and defocus direction of the imaging lens 2 can be detected by, with respect to a plurality of pixels, defining an image signal composed of a group of A-pixels as an A-image, defining an image signal composed of a group of B-pixels as a B-image, and detecting the amount of displacement between the A image and the B-image. Automatic focus detection (AF) according to the phase difference detection method can be thus realized with the signal output by the image sensor 4.

FIG. 2E to FIG. 2G schematically shows the mechanism of focus detection according to the phase difference detection method. FIG. 2E shows the state in which the focus is in front of the subject, FIG. 2F shows the state in which the focus is on the subject, and FIG. 2G shows the state in which the focus is behind the subject. Images 147a and 147b are schematic views showing the A-image and the B-image respectively, which are obtained from a group of pixels within a focus detection region that is set for the image sensor 4. In the case shown in FIG. 2F, the A-image 147a and B-image 147b are not displaced, and the focus is on the subject. In the case shown in FIG. 2E, the A-image 147a is displaced right of center, and the B-image 147b is displaced right of center. In the case shown in FIG. 2G, the A-image 147a is displaced right of center, and the B-image 147b is displaced left of center. The distance information of the subject can be obtained from these amounts of displacement (defocus amounts), the directions of displacement from the center, the focal distance of the imaging lens 2, and the distance between the image sensor 4 and the focus lens.

Figure 3B:
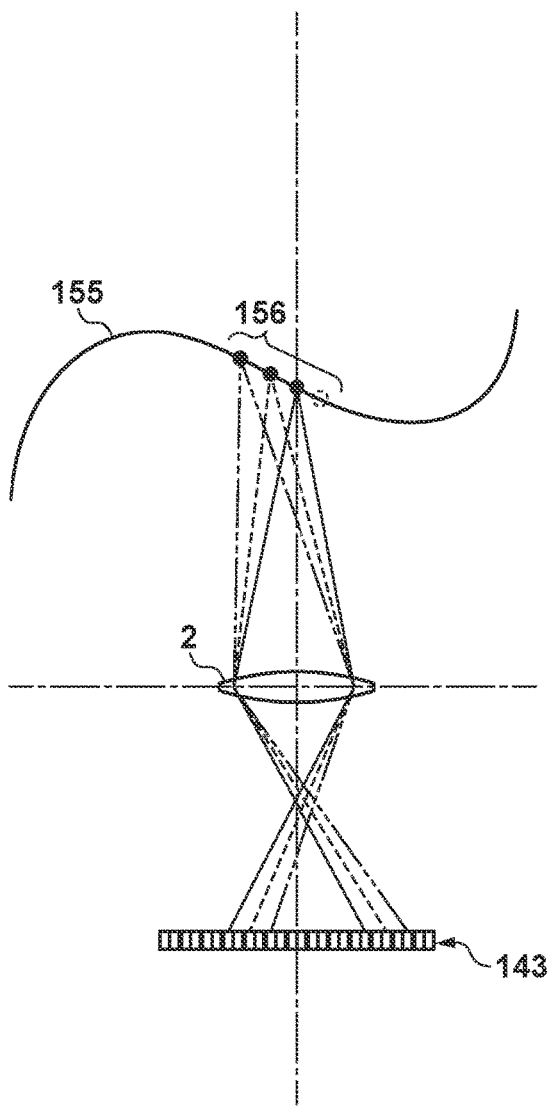

The following describes the method for calculating the subject distance with reference to FIG. 3A and FIG. 3B. FIG.

3A schematically shows the method for calculating the position of the subject. Given that an A-image 151a and a B-image 151b have been obtained, it can be seen from the focal distance of the imaging lens 2 and the distance information indicating the distance between the focus lens and the image sensor 4 that the luminous fluxes are deflected as indicated by the solid lines. Thus, it can be seen that the subject that is in focus is at a position 152a. Similarly, it can be seen that when a B-image 151c is obtained from the A-image 151a, the subject in focus is at a position 152b, and when a B-image 151d is obtained from the A-image 151a, the subject in focus is at a position 152c. As described above, it is possible to calculate the distance information of the subject at each pixel from the positional relationship between the A-image signal including the pixel and the corresponding B-image signal.

The three-dimensional information of the subject can be stored by holding the distance information of the subject, instead of holding the information of the imaging lens 2 at the time of capturing the A-image and the B-image. In the case of FIG. 3A for example, given that the A-image 151a and the B-image 151d have been obtained, a distance 153 from a pixel 154, which is at the midpoint corresponding to half the displacement amount of the image, to the subject position 152c is stored as the distance information of the subject at the pixel 154. In this way, the distance information of the subject can be held with respect to each pixel. The distance information may be stored as a depth image or a distance image.

FIG. 3B is a schematic diagram showing the case in which the distance information of the subject obtained by the three-dimensional information obtaining unit 12 using the above-described method is projected toward the subject, and the points to which the obtained distance information is projected are schematically shown as points 156. The shape of the surface of the actual subject (distance information set) is indicated by 155. In this way, the three-dimensional shape of the subject can be reproduced from the distance information obtained by the three-dimensional information obtaining unit 12. Note that in reality, image capturing is performed from a plurality of different directions with respect to the same subject, and the three-dimensional information of the entire subject is obtained by combining pieces of three-dimensional information obtained by image capturing in the different directions. However, in the case of a subject having a bottom surface that can be regarded as a horizontal surface, such as a building, image capturing of the bottom surface is unnecessary.

Next, with reference to FIG. 4A to FIG. 4E, a description is given of the influence that the difference between the obtained resolution and formative resolution of the three-dimensional information has upon the shape of a three-dimensional object to be formed. FIG. 4A shows the subject from which the three-dimensional information is obtained. FIG. 4B and FIG. 4C each schematically show coordinate points that constitute the three-dimensional information obtained from an image of the subject shown in FIG. 4A capture by the camera 1. FIG. 4B shows the three-dimensional information in the case where the obtained resolution is coarse, and FIG. 4C shows the three-dimensional information in the case where the obtained resolution is fine. Broken lines 21 show the external shape of the subject, 22 shows the coordinate points constituting the three-dimensional information, and 23 shows the obtained resolution. The obtained resolution 23 is the distance between adjacent coordinate points among the coordinate points 22 that constitute the three-dimensional information. In FIG. 4B, the number of coordinate points 22 constituting the three-dimensional information is smaller than that in FIG. 4C, and thus the obtained resolution 23 is coarse.

FIG. 4D and FIG. 4E show schematic views of objects that are obtained based on the pieces of three-dimensional information shown in FIG. 4B and FIG. 4C, by using a formative apparatus with a formative resolution that is higher than or equal to the obtained resolution shown in FIG. 4C. Here, objects are formed on the assumption that adjacent coordinate points in the three-dimensional information are connected by a straight line. As can be seen from a comparison between FIG. 4D and FIG. 4E, the object based on the three-dimensional information with an obtained resolution that is coarse has low reproducibility with respect to the sawtooth shaped upper surface. In this way, in the case where the obtained resolution 23 is coarse (in the case where the density of the obtained three-dimensional information is low), although the rough shape of the subject can be reproduced, a detailed shape cannot be appropriately reproduced in some cases.

Figure 5A:
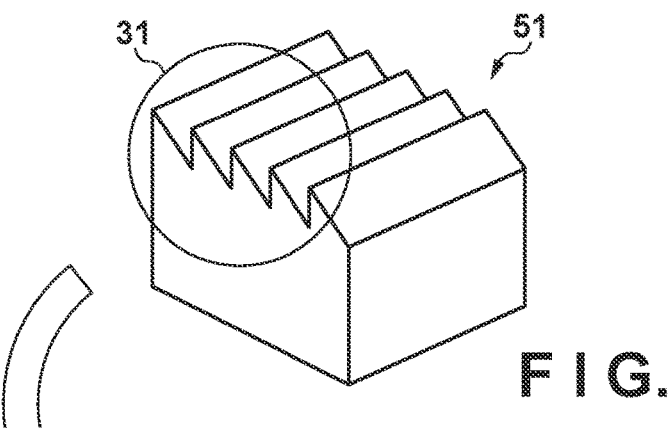
FIG. 5A to FIG. 5D are diagrams illustrating the influence that the difference between the obtained resolution and the formative resolution has upon an object to be formed.
Figure 5B:
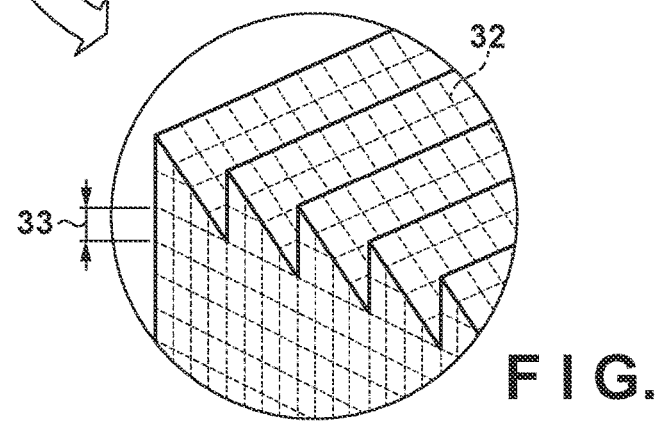
Figure 5C:
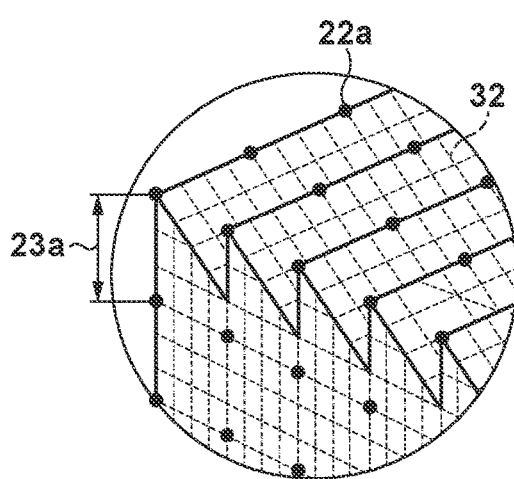
Figure 5D:
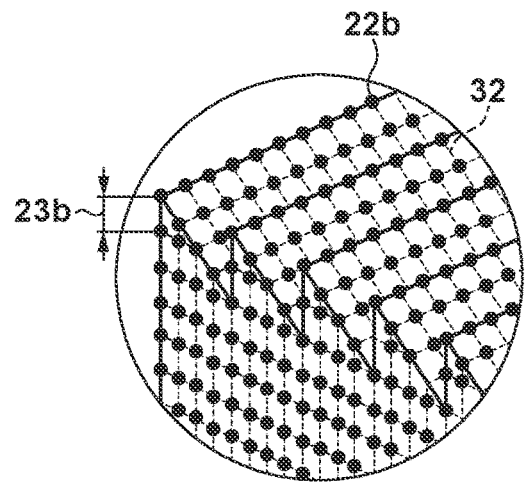

FIG. 5A shows the subject from which an object is to be formed using a formative apparatus, and FIG. 5B shows an enlarged view of a portion 31 of the upper part of a subject 51. Broken lines 32 in FIG. 5B show the tracks of scanning performed at the possible minimum interval during the formation of an object, and a formative resolution 33 is equal to the minimum interval. FIG. 5C and FIG. 5D respectively show the state in which the three-dimensional information constituted by coordinate points 22a with an obtained resolution 23a that is coarse has been added to FIG. 5B, and the state in which the three-dimensional information constituted by coordinate points 22b with an obtained resolution 23b that is fine has been added to FIG. 5B. The obtained resolution 23a of the three-dimensional information constituted by the coordinate points 22a is coarser than the formative resolution 33, and the obtained resolution 23b of the three-dimensional information constituted by the coordinate points 22b is substantially equal to the formative resolution 33.

FIG. 6A and FIG. 6B are the same as FIG. 5C and FIG. 5D. When such pieces of three-dimensional information are applied to a formative apparatus with the formative resolution 33, the three-dimensional objects shown in FIG. 6C and FIG. 6D can be formed. When the three-dimensional information with the obtained resolution 23a is applied, the sawtooth shape of the upper part of the subject 51 cannot be reproduced, as shown in FIG. 6C. On the other hand, when the three-dimensional information with the obtained resolution 23b is applied, the sawtooth shape of the upper part of the subject 51 can be reproduced as well, as shown in FIG. 6D. In this way, when the obtained resolution is lower than the formative resolution, shapes that are reproducible with a formative apparatus cannot be reproduced in some cases. Therefore, in order to fully take advantage of the formative resolution of the apparatus, it is necessary to obtain the three-dimensional information with an obtained resolution that is equal to the formative resolution or is higher than the formative resolution. Note that since the resolution here is represented as the pitch of the coordinate points, a smaller value indicates a higher resolution, and upon satisfying the relationship:

$$\text{Obtained resolution} \leq \text{Formative resolution} \qquad (1),$$

it can be judged that three-dimensional information that is sufficient for the formative apparatus to form a three-dimensional object has been obtained.

Therefore, when the obtained resolution stored in the obtained resolution storage unit 13 is higher than or equal to the formative resolution stored in the formative resolution storage unit 11, the comparison unit 14 shown in FIG. 1 can judge that three-dimensional information with a sufficient resolution has been obtained.

Figure 7A:
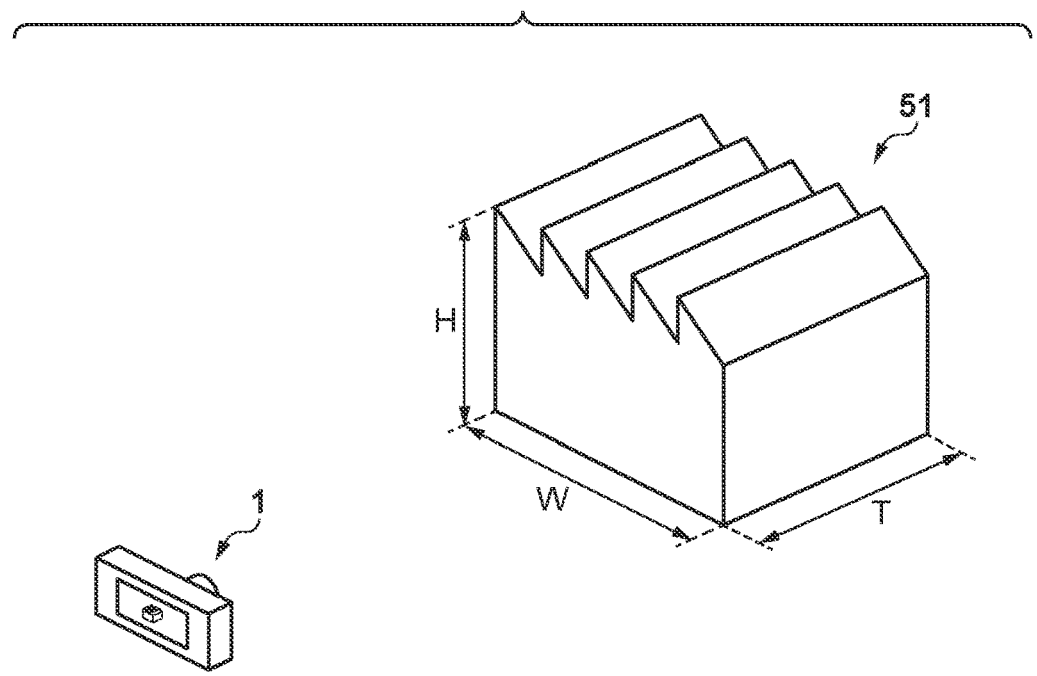
FIG. 7A and FIG. 7B are diagrams illustrating a formative magnification ratio.
Figure 7B:
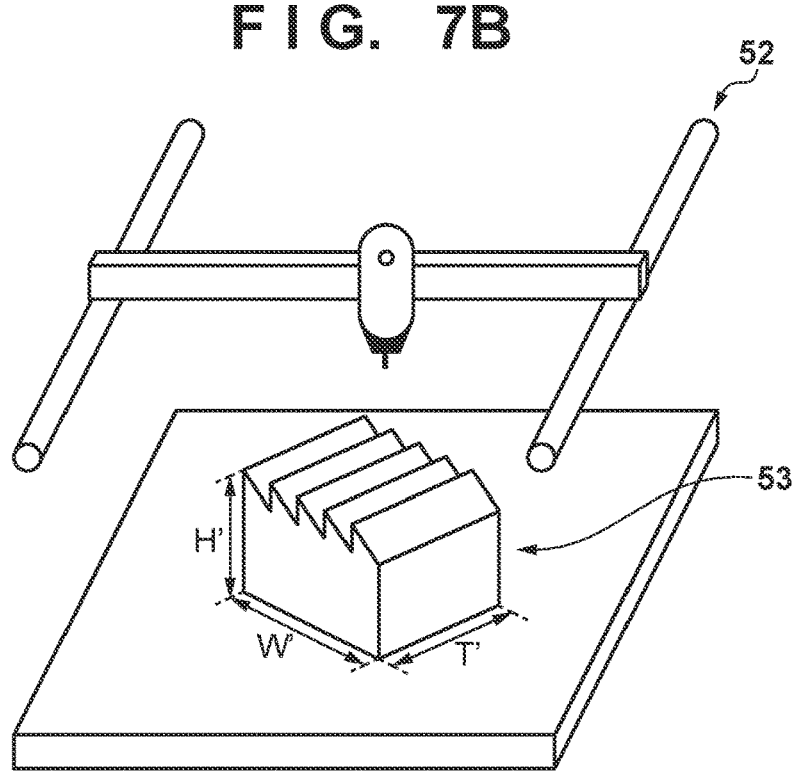

FIG. 7A and FIG. 7B are schematic views respectively showing a subject from which the three-dimensional information is obtained and a three-dimensional object generated by using the obtained three-dimensional information. In FIGS. 7A, W, T, and H respectively indicate the sizes of the subject 51 in the horizontal direction, in the depth direction, and in the vertical direction. FIG. 7B shows an object 53 formed, which has been generated by a formative apparatus 52 using the three-dimensional information obtained from an image of the subject 51 captured by the camera 1. W', T', and H' respectively indicate the size in the horizontal direction, the size in the depth direction, and the size in the vertical direction.

In the case where the same formative magnification ratio k is applied to each direction, the sizes W, T, and H of the subject and the sizes W', T', and H' of the object to be formed have the following relationships:

$$W \times k = W' \quad (2)$$

$$T \times k = T' \quad (3)$$

$$H \times k = H' \quad (4)$$

When generating an object having the actual sizes, the formative magnification ratio is k=1. The formative magnification ratio may have any value specified by the user from the formative magnification ratio input unit 10, or automatically set by the camera 1. For example, the formative magnification ratio may be calculated and determined based on the actual sizes of the subject whose image has been captured (W, T, and H in FIG. 7A) and the maximum sizes of the object that can be generated by the formative apparatus that is to be used. Alternatively, the user may be allowed to input the desired size of the object to be generated (e.g., the longest side W'=100 mm in FIG. 7B), and the formative magnification ratio may be calculated and determined based on the desired size and the actual size of the subject in the same direction (W in FIG. 7A).

When the formative magnification ratio k is used, a condition for judging whether or not three-dimensional information with a sufficient obtained resolution has been obtained, which is indicated by Expression (1) above, is modified as follows:

$$\text{Obtained resolution} \times k \leq \text{Formative resolution} \quad (5)$$

When the formative magnification ratio is taken into consideration, the comparison unit 14 can judge that three-dimensional information with a sufficient resolution has been obtained if the product of the obtained resolution stored in the obtained resolution storage unit 13 and the formative magnification ratio, and the formative resolution stored in the formative resolution storage unit 11 satisfy the relationship represented by Expression (5).

Figure 8A:
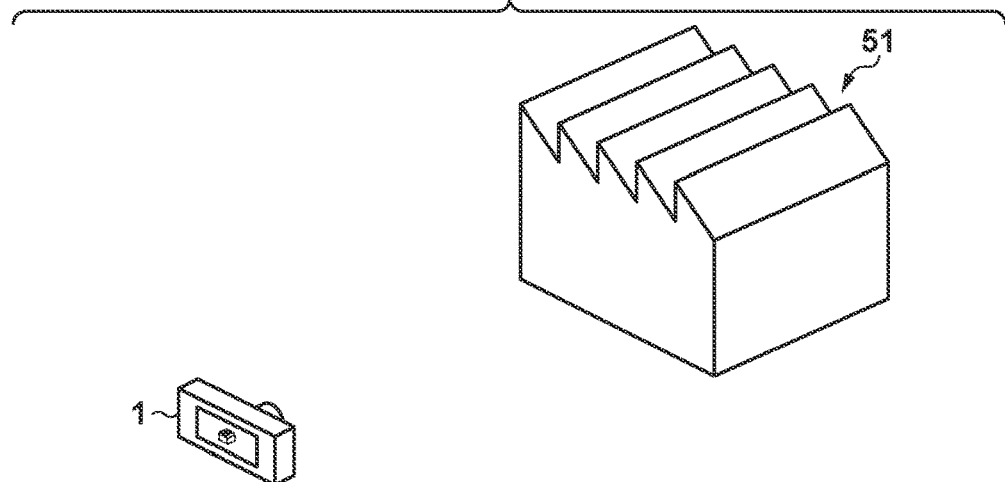
FIG. 8A to FIG. 8C are diagrams showing examples of the relationship between the obtained resolution and the formative resolution.
Figure 8B:
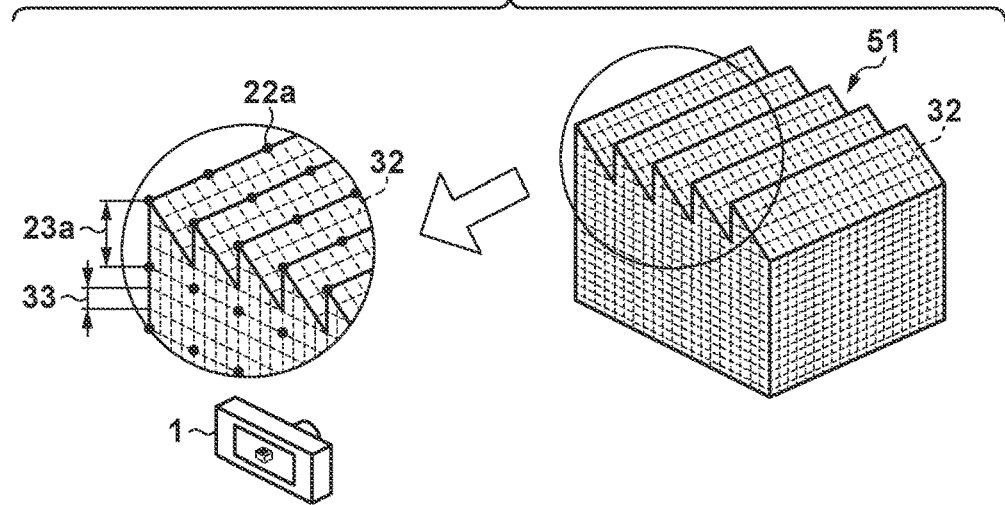
Figure 8C:
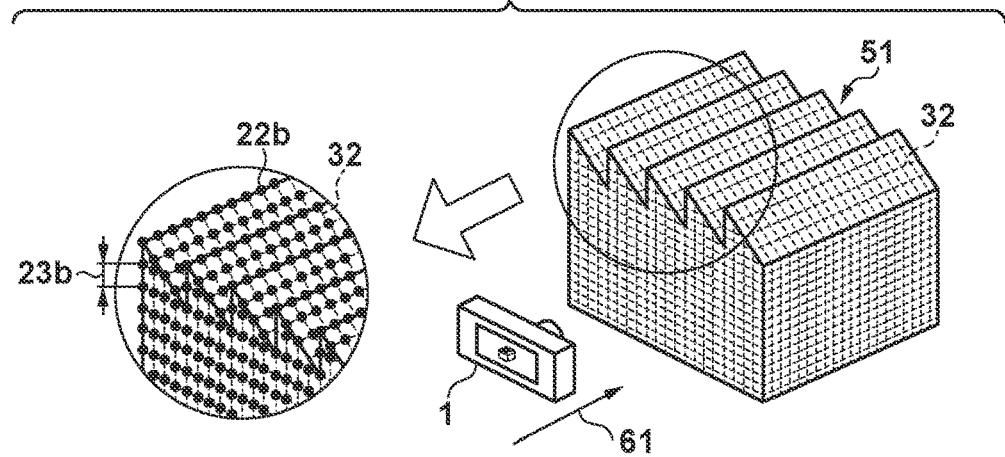
Figure 9A:
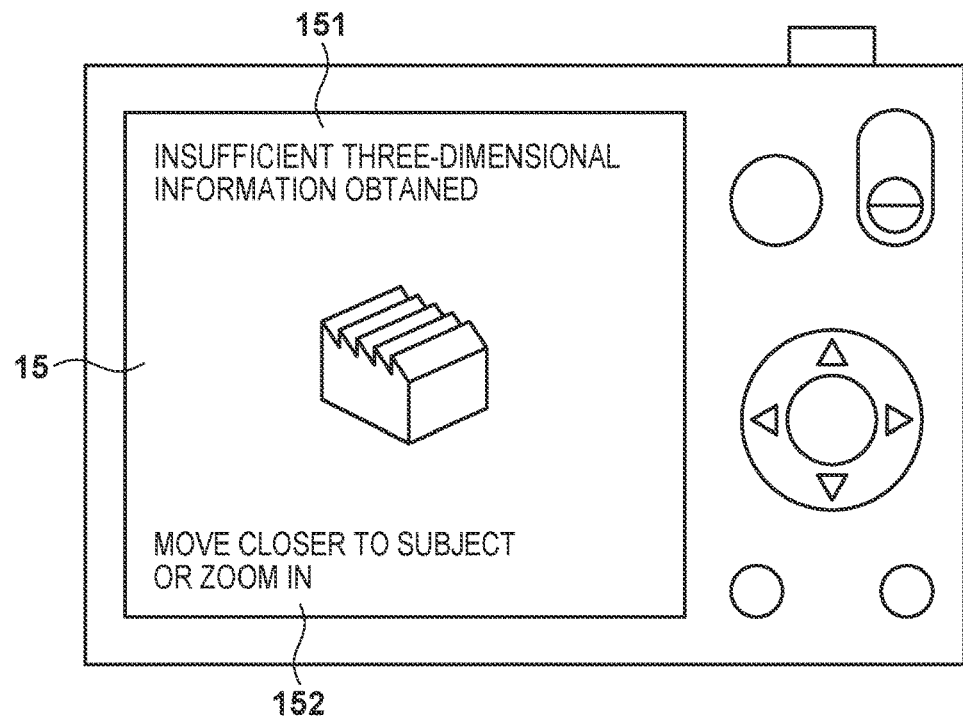
FIG. 9A and FIG. 9B are diagrams showing examples of notifications of a comparison result according to the first embodiment.
Figure 9B:
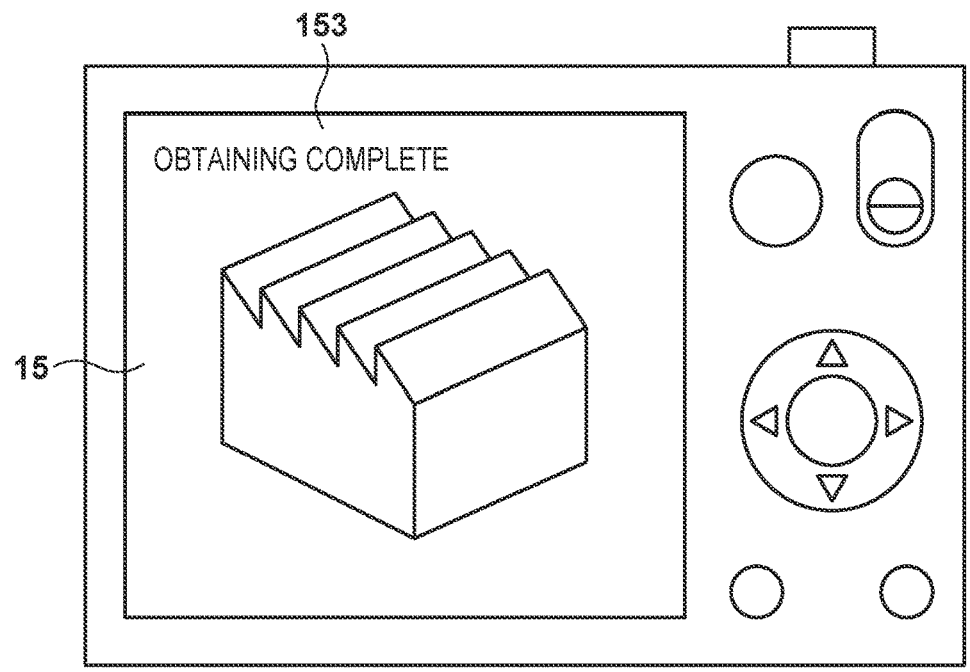

With reference to FIG. 8A to FIG. 8C and FIG. 9A and FIG. 9B, a description is given of the method for displaying the result of a comparison made by the comparison unit 14. Here, the formative magnification ratio is k=1, and an object having the actual size is created. FIG. 8A to FIG. 8C are diagrams showing the relationship between the subject from which the three-dimensional object is to be formed, the obtained resolution, and the formative resolution. FIG. 9A and FIG. 9B are diagrams showing examples of the result of a comparison made by the comparison unit 14, displayed on the display unit 15 of the camera 1.

FIG. 8A schematically shows a situation in which an image of the subject from which the three-dimensional information is to be obtained is captured by the camera 1. FIG. 8B schematically shows a situation in which the broken lines 32, which have a mesh shape composed of squares, each with the sides having a length corresponding to the formative resolution 33, are superposed on the subject in the state shown in FIG. 8A. FIG. 8B is an enlarged view of a portion of the upper part of the subject, and shows the three-dimensional information (coordinate points 22a) obtained by the camera 1 in the situation shown in FIG. 8B. In this situation, the formative resolution 33 is smaller than the obtained resolution 23a and does not satisfy the conditions expressed by Expression (1) or Expression (5) above, and it is thus necessary to recapture an image with modified shooting conditions.

Therefore, when a comparison result indicating that the obtained resolution is insufficient is obtained from the comparison unit 14, the system control unit 3 displays on the display unit 15 a method for increasing the obtained resolution and information prompting the user to recapture an image. FIG. 9A shows an example of the result displayed when the obtained resolution is insufficient, and this example includes a message 151, which is an example of the information for notifying that the obtained resolution is insufficient, and a message 152, which is an example of the information notifying a method for increasing the obtained resolution. These kinds of notifications may be realized by any other methods, for example by using audio or turning on a particular indicator lamp. Although the messages in the example shown in FIG. 9A are displayed on a playback screen after image capturing or on a live view screen, messages may be displayed on another display screen.

The obtained resolution increases as the area occupied by the subject in the captured image increases. Therefore, when recapturing an image, the obtained resolution can be increased by moving the camera 1 closer to the subject than at the time of previous image capturing, or, if the imaging lens 2 is a zoom lens, increasing the focal distance of the imaging lens 2 by, for example, operating a zoom lever included in the input unit 7. For this reason, the message 152 notifies the user of these methods. Note that other methods may be notified, such as the method by which the number of pixels used for image capturing is increased (for example, if the captured image size is small, the size is increased).

Note that it is possible to record information about the distance between the camera 1 and the subject at the time of previous image capturing, and information about the focal distance of the imaging lens 2 at the time of previous image capturing, and to aid the user to perform recapturing under shooting conditions that can increase the obtained resolution. For example, a configuration may be adopted such that the user is prompted to move closer to the subject when the focusing distance at the time of recapturing is greater than or equal to the focusing distance at the time of previous image capturing, or the user is prompted to zoom in on the subject when the focal point of the imaging lens 2 at the time of recapturing is smaller than or equal to the focal point at the time of previous image capturing. These kinds of aid may also be realized by the system control unit 3 by using a message on the display unit 15 or a voice output.

FIG. 8C is similar to FIG. 8B, but is different in that the camera 1 has been moved from the position shown in FIG. 8A and FIG. 8B in the direction indicated by an arrow 61 (in the direction toward the subject). When the area occupied by the subject in the captured image is thus greater than that in the situation shown in FIG. 8B, the obtained resolution 23b of the three-dimensional information in the situation shown in FIG. 8C is higher than the obtained resolution 23a of the three-dimensional information in the situation shown in FIG. 8B (the distance is shorter).

Consequently, the obtained resolution 23b and the formative resolution 33 satisfy the relationship shown in Expression (1) or Expression (5), and the system control unit 3 obtains, from the comparison unit 14, a comparison result indicating that three-dimensional information with a sufficient obtained resolution has been obtained. Then, the system control unit 3 causes the display unit 15 to display information indicating that three-dimensional information with a sufficient obtained resolution has been obtained. FIG. 9B shows an example of a comparison result displayed when the obtained resolution is sufficient, and this example includes a message 153, which is an example of the information for notifying that the obtained resolution is sufficient.

Note that in the present embodiment, the judgment as to whether or not the obtained resolution of the three-dimensional information is sufficient is made by performing image capturing a single time. However, the obtained resolution may be calculated with consideration of the three-dimensional information obtained from the results of image capturing performed a plurality of times, and then compared with the formative resolution.

Figure 10A:
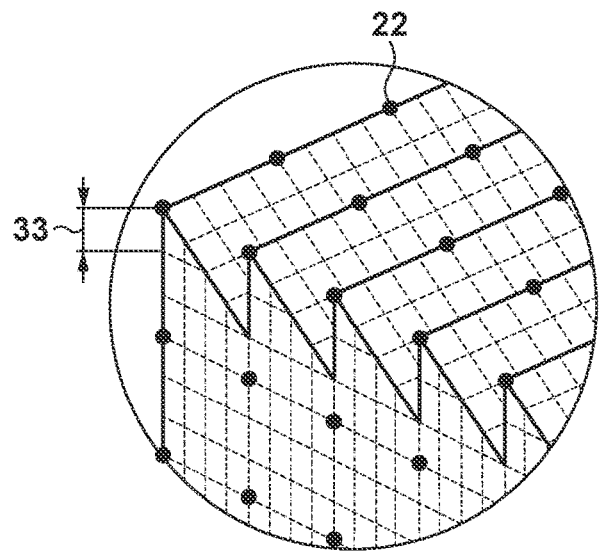
FIG. 10A to FIG. 10C are diagrams illustrating an example of a method for making a comparison between the obtained resolution and the formative resolution according to the first embodiment.
Figure 10B:
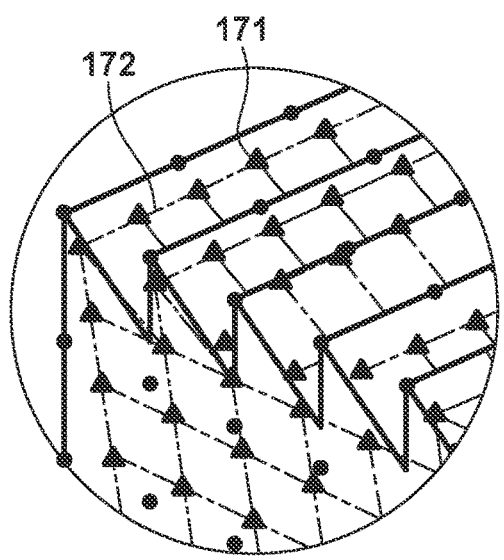
Figure 10C:
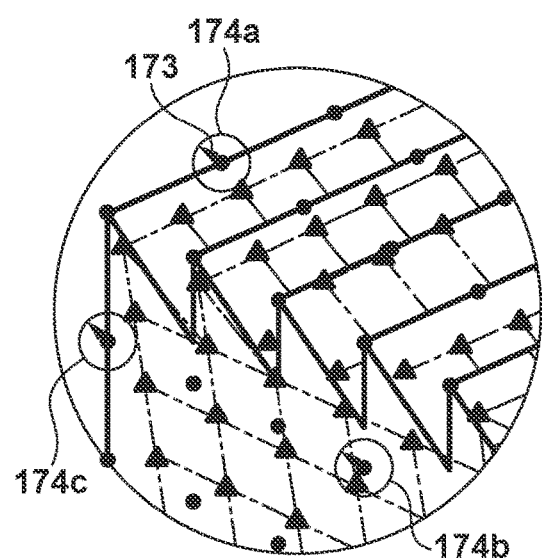

With reference to FIG. 10A to FIG. 10C, a description is given of a method for judging whether or not the obtained resolution is sufficient by using three-dimensional information obtained from images obtained by performing image capturing a plurality of times such that the same portion of the subject is included in the captured range. FIG. 10A corresponds to FIG. 5C, and shows the outline of the three-dimensional information obtained by performing image capturing a single time. In this situation, the interval between the coordinate points 22 constituting the three-dimensional information is greater than the formative resolution 33, and the obtained resolution is insufficient. In such a case, as described above, the user is prompted to perform recapturing under conditions that can achieve a higher obtained resolution.

FIG. 10B schematically shows a situation in which the three-dimensional information obtained from the image obtained by recapturing is converted into values in the coordinate system of the three-dimensional information obtained by image capturing performed for the first time, and then the pieces of three-dimensional information obtained by image capturing performed twice are integrated. The three-dimensional information constituted by coordinate points 171 obtained at the time of recapturing and the object generated by using it are schematically represented by 172. Neither the three-dimensional information obtained by image capturing performed for the first time (the group of coordinate points 22) nor the three-dimensional information obtained by image capturing performed for the second time (the group of coordinate points 171) alone suffices as the formative resolution. However, the reproducibility of the shape of the subject can be improved by using both.

FIG. 10C schematically shows a comparison method for judging whether or not the obtained resolution of the three-dimensional information obtained by performing image capturing a plurality of times as shown in FIG. 10B satisfies the formative resolution and the relationship expressed by Expression (1) or Expression (5). Spheres 174a to 174c are each a sphere whose center point is one of the coordinate points constituting the three-dimensional information, and which has a formative resolution 173 as a radius. Such a sphere is assumed for each coordinate point, and if it can be confirmed that every coordinate point has a sphere that includes at least one other coordinate point of the three-dimensional information, it can be judged that the obtained resolution of the three-dimensional information satisfies the formative resolution and the relationship expressed by Expression (1) or Expression (5).

Such a method is used for the following reason. In the case of three-dimensional information obtained by performing image capturing a single time, the coordinate point that is closest to the coordinate point corresponding to a certain pixel of the captured image can be obtained from the coordinate point corresponding to the adjacent pixel. However, this is not always true in the case where pieces of three-dimensional information obtained by performing image capturing a plurality of times are integrated. Note that when the formative magnification ratio k is not 1, that is, when the object to be formed does not have the actual size, the comparison is made by using a value obtained by multiplying the radius of the spheres used for the judgment (formative resolution 173) by 1/k, which is the inverse of the formative magnification ratio k.

Note that there are no particular restrictions on how to calculate the obtained resolution according to the present invention, and known measuring technology using captured images may be adopted. For example, the three-dimensional coordinate points on the surface of the subject corresponding to the pixels may be obtained from the pixel pitch of the image sensor 4, the focal distance of the imaging lens 2 at the time of image capturing, and the distance information of each pixel. With respect to each of the three-dimensional coordinates respectively corresponding to the pixels, the distance from the three-dimensional coordinate point corresponding to an adjacent pixel is obtained, and the maximum value of the distances can be used as the obtained resolution.

Also, since the three-dimensional information of the entire subject cannot be obtained by performing image capturing a single time, it is necessary to capture images of the subject a plurality of times from different angles, and to combine the pieces of three-dimensional information obtained based on the individual captured images. For example, it is possible to achieve the above by capturing images of the subject such that the images overlap each other, and specifying points corresponding to each other in the three-dimensional coordinate system. Known methods, of which the details are omitted, may be employed as the image capturing method for obtaining the three-dimensional information of the subject and the method for integrating the pieces of three-dimensional information based on images captured from different angles. In addition, regarding the part that does not necessarily require a captured image, such as the bottom surface of the subject which can be considered as a flat surface, the three-dimensional information may be generated without using an image.

The spirit of the present invention lies in making a judgment as to whether or not the three-dimensional information of the subject obtained from a captured image has a sufficient resolution for use with a particular formative apparatus, and providing aid in performing image capturing for obtaining three-dimensional information having an appropriate resolution. Therefore, the present invention does not depend on any image capturing method for obtaining the three-dimensional information of the entire subject, or any method for integrating the obtained pieces of three-dimensional information. If necessary, it is possible to measure and use the three-dimensional position of the camera 1 or the direction in which image capturing is performed.

Furthermore, in the present embodiment, although a method for increasing the obtained resolution is displayed on the display unit 15 in order to prompt the user to change the shooting conditions, the camera 1 may automatically change the shooting conditions in order to increase the obtained resolution. For example, when the obtained resolution is insufficient as shown in FIG. 8B, the system control unit 3 may automatically perform control to increase the obtained resolution of the three-dimensional information by increasing the focal distance of the imaging lens 2 to a predetermined length, or increasing the size (the number of pixels) of captured images.

Meanwhile, as a method for changing the obtained resolution that can be set for the camera 1, there is a method for increasing the distance resolution in the depth direction from the camera 1. As described above, according to the present embodiment, the distance in the depth direction is obtained by using the phase difference among the plurality of parallax images generated by the microlens array provided on the front surface of the image sensor 4. Therefore, it is possible to increase the distance resolution in the depth direction by replacing the combination of parallax images to be used with a combination of images with a larger parallax. In FIG. 2A to FIG. 2G, each pixel is composed of one microlens 142 and two photodiodes 143a and 143b. However, it is possible to create parallax images having a different baseline length by forming each pixel with a larger number of photodiodes. In the case of automatically changing the shooting conditions, the system control unit 3 displays, on the display unit 15, a message prompting the user to perform recapturing. In this case, the user may also be notified that the shooting conditions have been changed.

FIG. 11 is a flowchart related to the operation to obtain the three-dimensional information performed by the camera 1 according to the present embodiment. This operation is executed in, for example, a shooting mode for obtaining the three-dimensional information of the subject. It is assumed that in the shooting mode for obtaining the three-dimensional information as well, the same processing is performed as in the standby state of a general still image shooting mode, such as the state of performing live-view display on the display unit 15.

In step S8001, the system control unit 3 judges whether or not the formative resolution has been input (whether or not it has been set for the formative resolution storage unit 11). If the formative resolution has been input, the system control unit 3 proceeds to step S8002, and if the formative resolution has not been input, the system control unit 3 proceeds to step S8003. In step S8002, the system control unit 3 reads out, from the formative resolution storage unit 11, the formative resolution, which has been input by the user using the formative resolution input unit 9, and proceeds to step S8004. In step S8003, the system control unit 3 displays a screen for inputting the formative resolution on the display unit 15, and waits until the user inputs the formative resolution via the formative resolution input unit 9. As described above, the formative resolution may be input by directly inputting a value, or by another method such as inputting information that can specify the formative resolution, such as an apparatus model number. In the latter case, the system control unit 3 obtains the formative resolution by searching a table or the like that has been stored in advance, by using the input information. The system control unit 3 stores the formative resolution to the formative resolution storage unit 11, and then proceeds to step S8004. Note that the formative magnification ratio can also be obtained in the same manner as in step S8001 to step S8003. The formative magnification ratio is stored to the obtained resolution storage unit 13.

In step S8004, the system control unit 3 waits for an instruction to start image capturing from the user. The instruction to start image capturing may be issued by pressing a shutter button included in the input unit 7 all the way, for example. Note that an instruction to prepare for image capturing may be issued prior to the instruction to start image capturing. Upon input of the instruction to prepare for image capturing, the system control unit 3 performs an exposure control operation, a focus detection operation, etc.

In response to the instruction to start image capturing, the system control unit 3 exposes the image sensor 4 according to an exposure condition that has been set. Upon completion of the exposure, the system control unit 3 reads out an image signal from the image sensor 4 by using the image processing unit 5, and generates one pair of parallax images, which consists of one image compose of a group of A-pixels and one image composed of a group of B-pixels.

The system control unit 3 reads out the parallax images stored in the memory unit 6, and provides them to the three-dimensional information obtaining unit 12. The three-dimensional information obtaining unit 12 obtains the distance information at the position of each pixel (constituent unit having an A-pixel and a B-pixel) of the image sensor 4. Furthermore, the three-dimensional information obtaining unit 12 calculates, as the three-dimensional information, the three-dimensional coordinates respectively corresponding to the pixels, from information such as the focal distance of the imaging lens 2 and the pixel pitch of the image sensor. The three-dimensional information thus calculated is stored to the memory unit 6 via the system control unit 3, for example.

In step S8005, the system control unit 3 determines the subject area in the captured image. The subject area may be specified by the user via the subject selection unit 8, or determined by the system control unit 3 searching for a group of images having a similar color from pixel information of the focused area within the images, or extracting the outline. In the case of specification by the user, the system control unit 3 may display the captured image on the display unit 15, prompt the user to specify the area including the subject area within the image via the subject selection unit 8, detect the outline within the specified area, and extract the subject area. Alternatively, the system control unit 3 may perform outline extraction on the entire captured image, and within the area having a closed outline, consider the area specified by the user as the subject area. Image processing such as outline extraction may be performed by the image processing unit 5. Any method may be adopted insofar as the subject area in the captured image can be specified.

In step S8006, the system control unit 3 extracts, from the three-dimensional information calculated by the three-dimensional information obtaining unit 12 in step S8004, the three-dimensional information corresponding to the pixels included in the subject area as the three-dimensional information of the subject. Then, the system control unit 3 obtains, with respect to each pixel included in the subject area, the distance on the subject between the corresponding three-dimensional information and the three-dimensional information corresponding to an adjacent pixel, and detects the minimum distance. The system control unit 3 stores the largest value among the minimum distances respectively obtained for the pixels to the obtained resolution storage unit 13 as the obtained resolution.

In step S8006, the system control unit 3 causes the comparison unit 14 to compare the formative resolution and the obtained resolution, obtains the comparison result, and proceeds to step S8007. Specifically, as described above, the comparison unit 14 makes a comparison between the resolutions according to Expression (5), using the formative resolution stored in the formative resolution storage unit 11 and the obtained resolution and the formative magnification ratio stored in the obtained resolution storage unit 13.

In step S8007, the system control unit 3 displays the comparison result of step S8006 on the display unit 15, or, if the comparison result indicates that the obtained resolution is insufficient, determines the shooting conditions for recapturing based on predetermined settings, and then proceeds to step S8008. In step S8007, the comparison result may be displayed by the method described with reference to FIG. 9A and FIG. 9B. Also, in step S8007, the determination of the shooting conditions for recapturing is the determination of the shooting conditions for decreasing the value of the obtained resolution of the three-dimensional information, and a method by which the focal distance of the imaging lens 2 is increased, a method by which the captured image size is increased, etc., may be adopted.

In step S8008, the system control unit 3 judges whether or not to change the formative resolution, and proceeds to step S8009 in the case of changing the formative resolution, and proceeds to step S8011 in the case of not changing the formative resolution. The case of judging in step S8008 that the formative resolution is to be changed is, for example, the case in which obtained resolution is much higher than the formative resolution, and it is possible to form a more detailed shape than the shape that can be reproduced with the current formative resolution.

In such a case, in step S8008, the system control unit 3 displays, on the display unit 15, information indicating that a more detailed shape can be formed, for example, thereby notifying the user of the fact. Thus the user can know that the object can be formed with a more detailed shape, and can set the formative resolution again by replacing the formative apparatus or setting a higher value for the formative apparatus from among the formative resolutions that can be set.

Note that in the case where the user does not input a new formative resolution in step S8008 for example (e.g., the case where a cancellation instruction is made or the case where a predetermined period elapsed without an input), the system control unit 3 proceeds to step S8011.

Meanwhile, in the case where a new formative resolution is input, the system control unit 3 stores the newly input formative resolution to the formative resolution storage unit 11 in step S8009, and then proceeds to step S8010. In step S8010, the system control unit 3 again makes a comparison between the formative resolution stored in the formative resolution storage unit 11 and the obtained resolution stored in the obtained resolution storage unit 13 according to Expression (5) by using the comparison unit 14, and returns to step S8007.

In step S8011, the system control unit 3 judges whether or not recapturing is required, and returns to step S8004 if it is judged that recapturing is required, and waits for the next instruction to start image capturing. If it is judged that recapturing is not required, the system control unit 3 ends the processing.

The judgement as to whether or not recapturing is required can be performed based on whether or not it can be judged from the comparison result obtained in step S8007 or step S8010 that three-dimensional information having a sufficient resolution for the three-dimensional object formative apparatus to form a three-dimensional object has been obtained. If Expression (5) is not satisfied, it can be judged that recapturing is required. As an alternative method, it may be judged that recapturing is required when the user inputs an instruction to perform recapturing.

Figure 12:
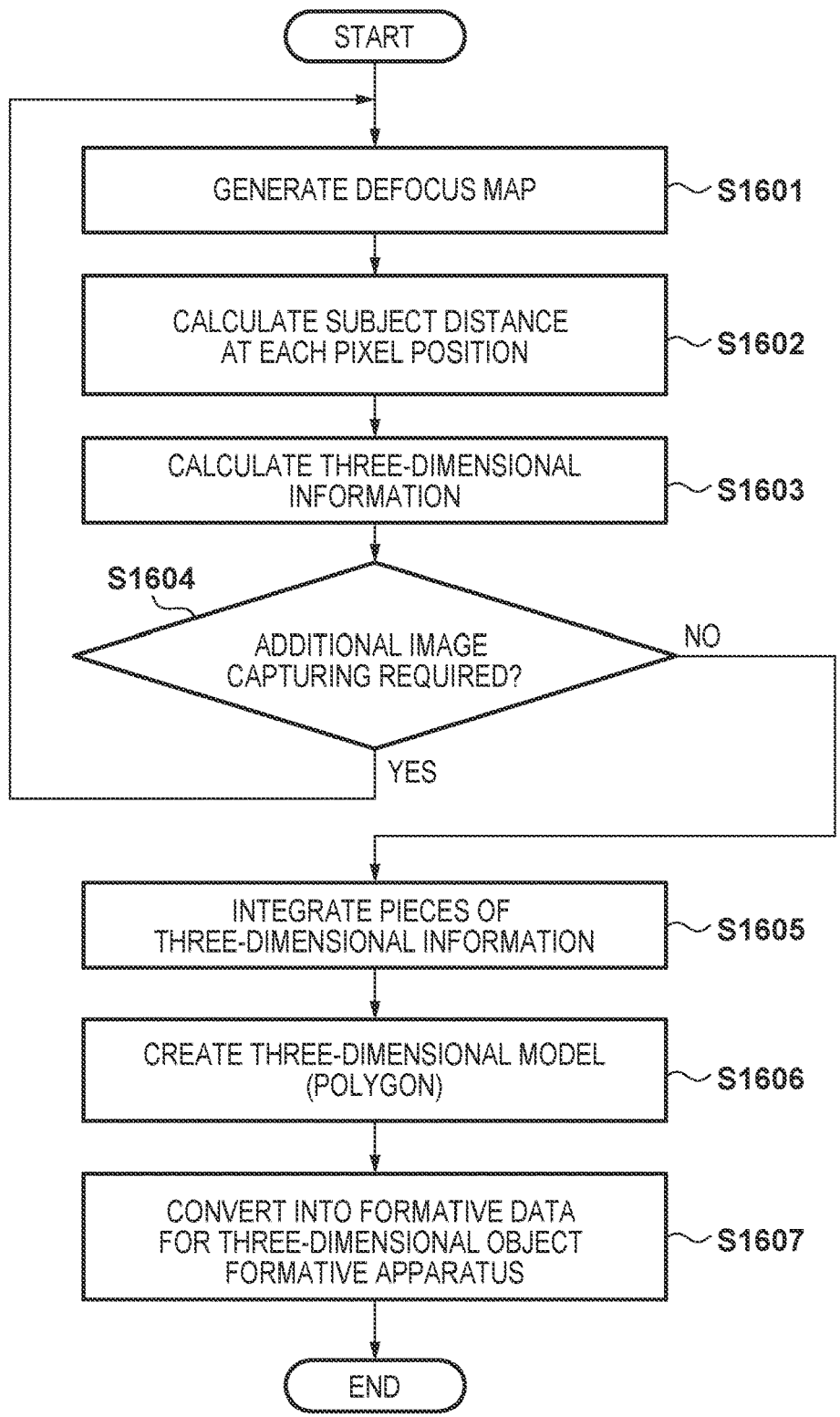
FIG. 12 is a flowchart illustrating data processing for obtaining formative data from three-dimensional information according to the first embodiment.

Here, with reference to the flowchart shown in FIG. 12, a description is given of data processing from when the three-dimensional information is obtained by the camera 1 to when data used by the formative apparatus is obtained.

When image capturing is performed and the three-dimensional information starts to be obtained, the three-dimensional information obtaining unit 12, in step S1601, calculates the amount of displacement (defocus amount) between the A-image and the B-image with respect to each pixel by using one pair of parallax images as described with reference to FIG. 2A to FIG. 2G, and thus generates a defocus map.

Next, in step S1602, the three-dimensional information obtaining unit 12 calculates the subject distance at each pixel position, from the defocus map obtained in step S1601, the focal distance of the imaging lens, and the position of the focus lens. The information of subject distance (distance image) is stored to the memory unit 6 by the system control unit 3.

In step S1603, the system control unit 3 reads out, from the memory unit 6, the distance information corresponding to the pixels corresponding to the subject area within the image, and calculates the three-dimensional information of the subject by using the distance information together with the focal distance of the imaging lens and the pixel pitch.

In step S1604, the system control unit 3 judges whether or not it is necessary to additionally perform image capturing. This judgment is equivalent to a judgment as to whether or not the required amount of three-dimensional information for forming a three-dimensional object has been obtained with a sufficient obtained resolution. For example, when a portion of the outer surface of the subject is left without being captured (the bottom surface may be an exception), or when there is an area with an insufficient obtained resolution, the system control unit 3 judges that image capturing is required in order to obtain three-dimensional information with a sufficient obtained resolution with respect to these portions. The judgment as to recapture in step S8011 is also included in the judgment above.

Note that the judgment in step S1604 may be performed only as to whether three-dimensional information with a sufficient obtained resolution has been obtained with respect to a portion of the outer surface of the subject, and the judgment as to whether three-dimensional information with a sufficient obtained resolution has been obtained with respect to the entire outer surface of the subject may be performed at the time of integrating pieces of three-dimensional information.

In the case where it is judged based on the criterion of step S1604 that three-dimensional information with a sufficient obtained resolution has been obtained, and that it is unnecessary to additionally perform image capturing, the system control unit 3 performs the integration of pieces of three-dimensional information in step S1605.

In step S1605, the system control unit 3 integrates pieces of three-dimensional information that have been obtained so far by unifying their respective coordinate systems. Three-dimensional information obtained at each instance of image capturing is constituted by values in the coordinate system with the point of origin at the position of the image sensor 4 at the time of image capturing. Therefore, the values need to be converted into values in the same coordinate system, and then integrated. Although there are no particular restrictions on how to integrate the coordinate systems, it is possible to record the three-dimensional position and the image capturing direction of the camera 1 at each instance of image capturing, and to integrate the coordinate systems based on this information. Alternatively, it is possible to unify the coordinate systems by estimating relative differences with respect to the camera position and the image capturing direction at each instance of image capturing from the relationship of the shapes of the subject in the captured images, and then making a correction. The system control unit 3 stores the integrated three-dimensional information to the memory unit 6. Also, as described above, the judgment as to whether or not there is any area of the outer surface of the subject that has not been subjected to image capturing may be performed based on the result of integration here.

In step S1606, the system control unit 3 creates a three-dimensional model of the object to be formed, based on the three-dimensional information stored in the memory unit 6. The three-dimensional model can be created by forming a polygon (surfaces) based on the three-dimensional coordinate points (three-dimensional information) stored in the memory unit 6. Although there are no restrictions on how to create the polygon, a method according to a so-called STL (Stereolithography) format may be adopted for example, by which three points that are closest are selected from among the obtained three-dimensional coordinate points, one surface is created from the three points, and surfaces thus created are sequentially connected.

In step S1607, the system control unit 3 converts the three-dimensional model into formative data in the format that is suited for direct use by the three-dimensional object formative apparatus, records the formative data to the memory unit 6 or a detachable recording medium, and ends the processing. Note that in the case of a three-dimensional object that can use the three-dimensional model information created in step S1606 without any change, the data conversion in step S1607 is not required.

Note that among the series of processing described above, processing performed in and after step S1605 may be executed by an apparatus having a higher processing capacity and a larger storage capacity than the camera 1, such as a personal computer.

Also, the comparison of the obtained resolution and the formative resolution, which is described above as being performed in step S1604, may be performed in step S1602, step S1605, or step S1606. In the case of generating three-dimensional information for a given area based on parallax images obtained by performing image capturing a single time, the obtained resolution and the formative resolution may be compared with each other in any of steps S1602, S1605, and S1606. On the other hand, in the case as described with reference to FIG. 10A to FIG. 10C, where image capturing is performed a plurality of times in order to increase the resolution by complementing the three-dimensional information obtained by performing image capturing a single time, the comparison is performed in or after step S1605, because it is necessary to integrate the coordinate points of the pieces of three-dimensional information.

Also, the comparison with the formative resolution may be performed after the conversion into a three-dimensional model as shown in step S1606. Note that when performing the comparison by using the data format described for step S1605 and step S1606, at least processing up to the conversion into the data format used for the comparison is executed by the camera 1.

As described above, according to the present embodiment, in an image capture apparatus that can obtain parallax images and calculate three-dimensional information of a subject within images, a judgment is made as to whether or not the calculated three-dimensional information has a resolution that is suited for use by a formative apparatus. Therefore, in the case where it is judged that the resolution of the three-dimensional information is insufficient, the image capture apparatus can prompt the user to recapture an image under shooting conditions that will improve the resolution, or automatically determine shooting conditions that will improve the resolution, and thus can aid in obtaining a desired three-dimensional information that is suited to the formative apparatus.

Second Embodiment

Next, a description is given of a second embodiment of the present invention. The present embodiment can be realized with the camera 1 having the same configuration as that in the first embodiment, except that the input unit 7 does not have the formative resolution input unit 9, and therefore operations are described with reference to FIG. 1.

In the first embodiment, the formative resolution input by the user via the formative resolution input unit 9 is stored to the formative resolution storage unit 11. In contrast, according to the second embodiment, the formative resolution and information specifying the formative apparatus are associated with each other and stored in the formative resolution storage unit 11, and the user is notified of an appropriate formative resolution or information about an apparatus having an appropriate formative resolution according to the obtained resolution and the formative magnification ratio.

Figure 13:
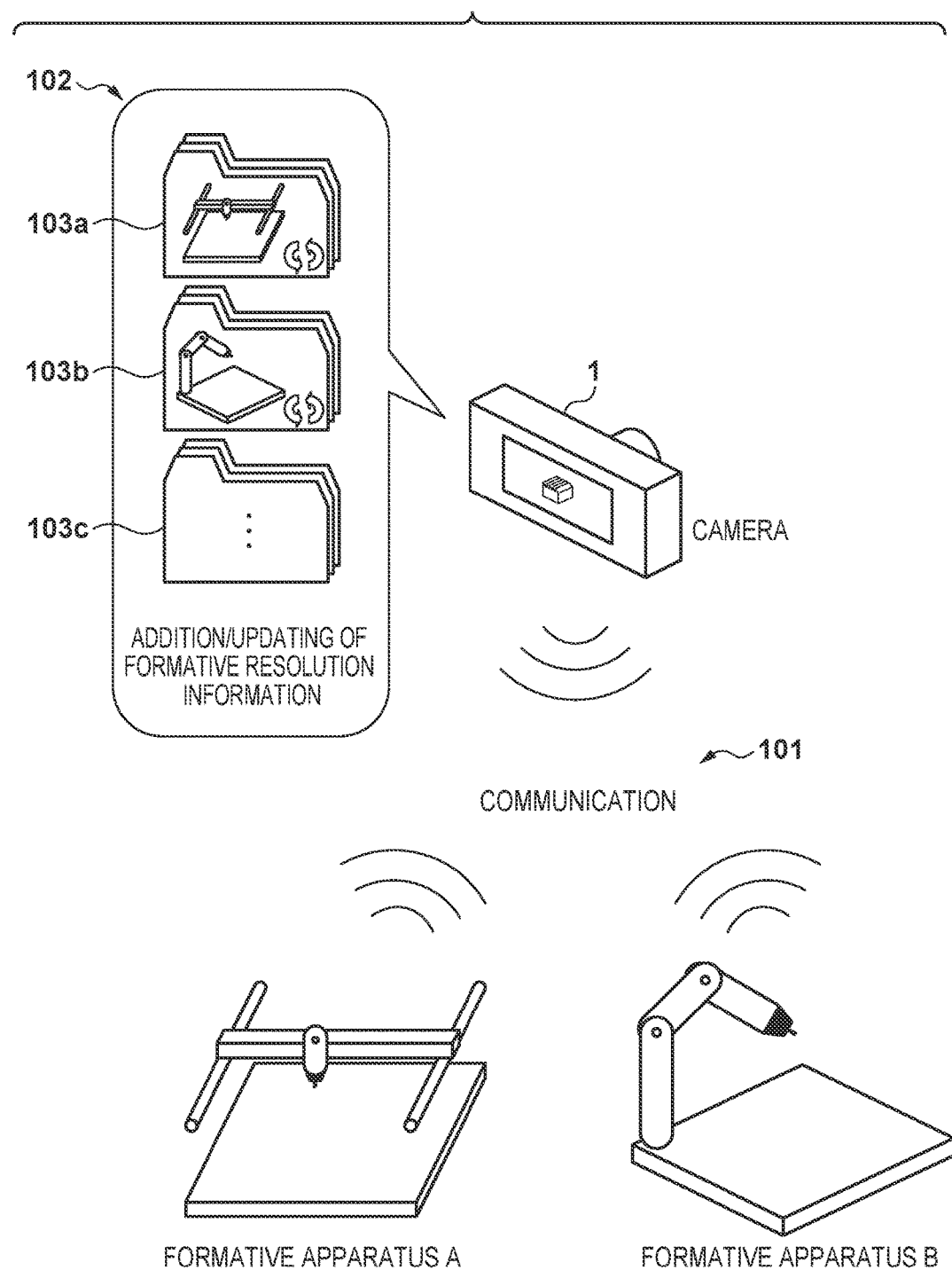
FIG. 13 is a diagram schematically showing communication between a camera and a formative apparatus according to a second embodiment.

Also, as shown in FIG. 13, information of the resolution of the formative apparatus, that has been stored to the formative resolution storage unit 11 in advance, may be subjected to addition or updating by wired or wireless communication with the three-dimensional object formative apparatus.

In FIG. 13, 101 shows a situation in which the camera 1 is performing wireless communication with formative apparatuses. Although FIG. 13 shows that the camera 1 is performing communication with two formative apparatuses (formative apparatuses A and B), the camera 1 may perform communication with one formative apparatus at a time, and performs addition to and updating of the formative resolution information. 102 schematically shows the inside of the formative resolution storage unit 11, where 103*a*, 103*b*, and 103*c* each show the formative resolution information of the corresponding formative apparatus, and represent situations in which the formative resolution information stored in advance is subjected to updating or addition.

In the present embodiment, the system control unit 3 calculates the obtained resolution at the time of obtaining the three-dimensional information, and then calculates the formative resolution suited to the obtained resolution, and notifies the user via the display unit 15. Alternatively, the system control unit 3 searches the formative resolution storage unit 11 for a formative apparatus that has a formative resolution that is suited to the obtained resolution, and notifies the user of information that can specify the apparatus (e.g., the model number) via the display unit 15.

Figure 14A:
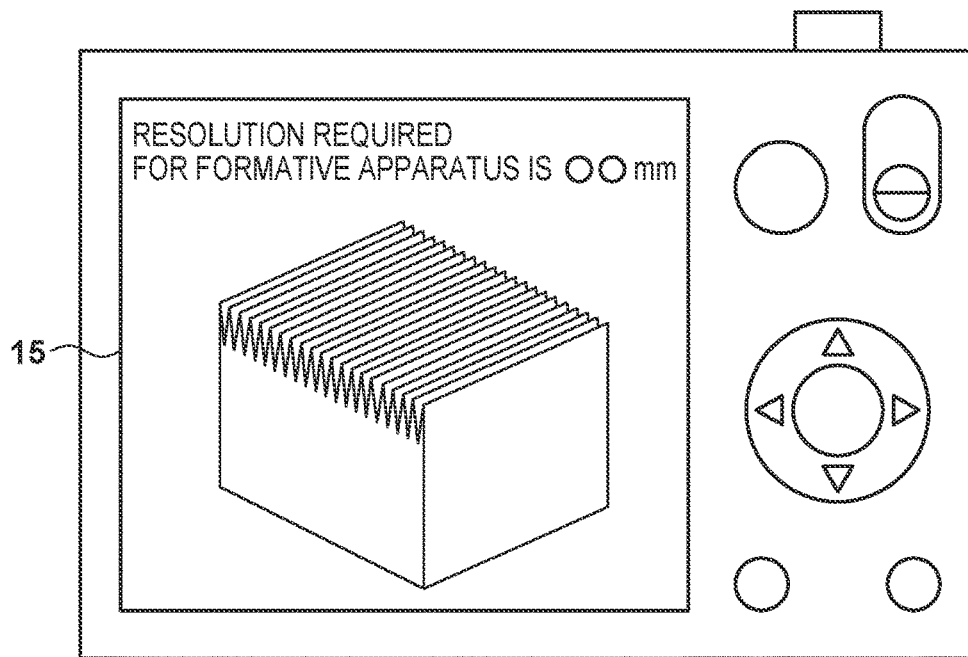
FIG. 14A and FIG. 14B are diagrams showing examples of notifications of information according to the second embodiment.
Figure 14B:
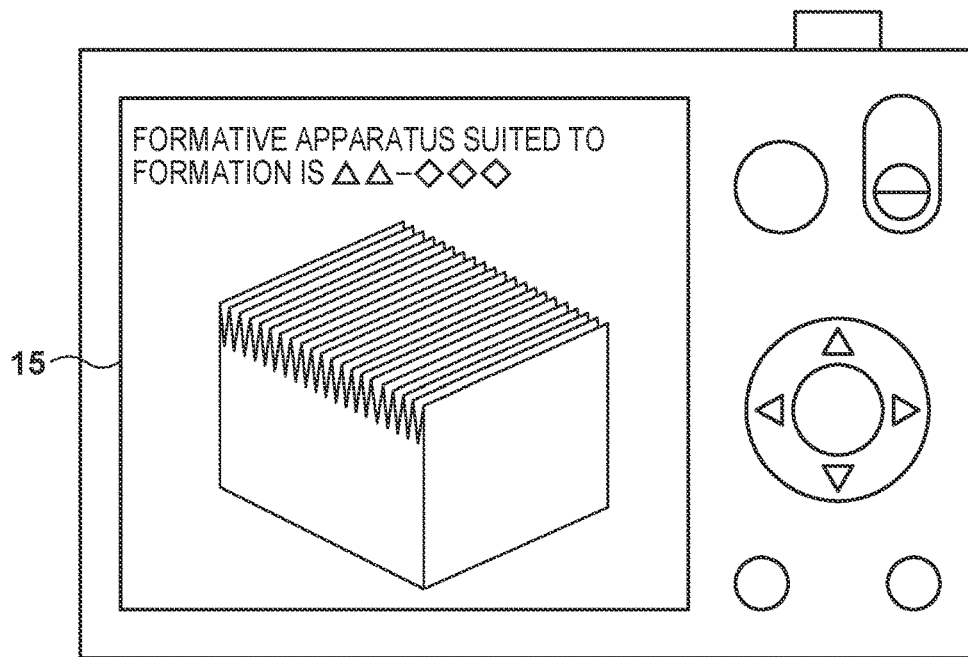

FIG. 14A and FIG. 14B show examples of notifications. FIG. 14A shows an example in which the required formative resolution calculated from the obtained resolution and the formative magnification ratio is displayed, and FIG. 14B shows an example in which the model number of the formative apparatus that has the required formative resolution is displayed.

Figure 15:
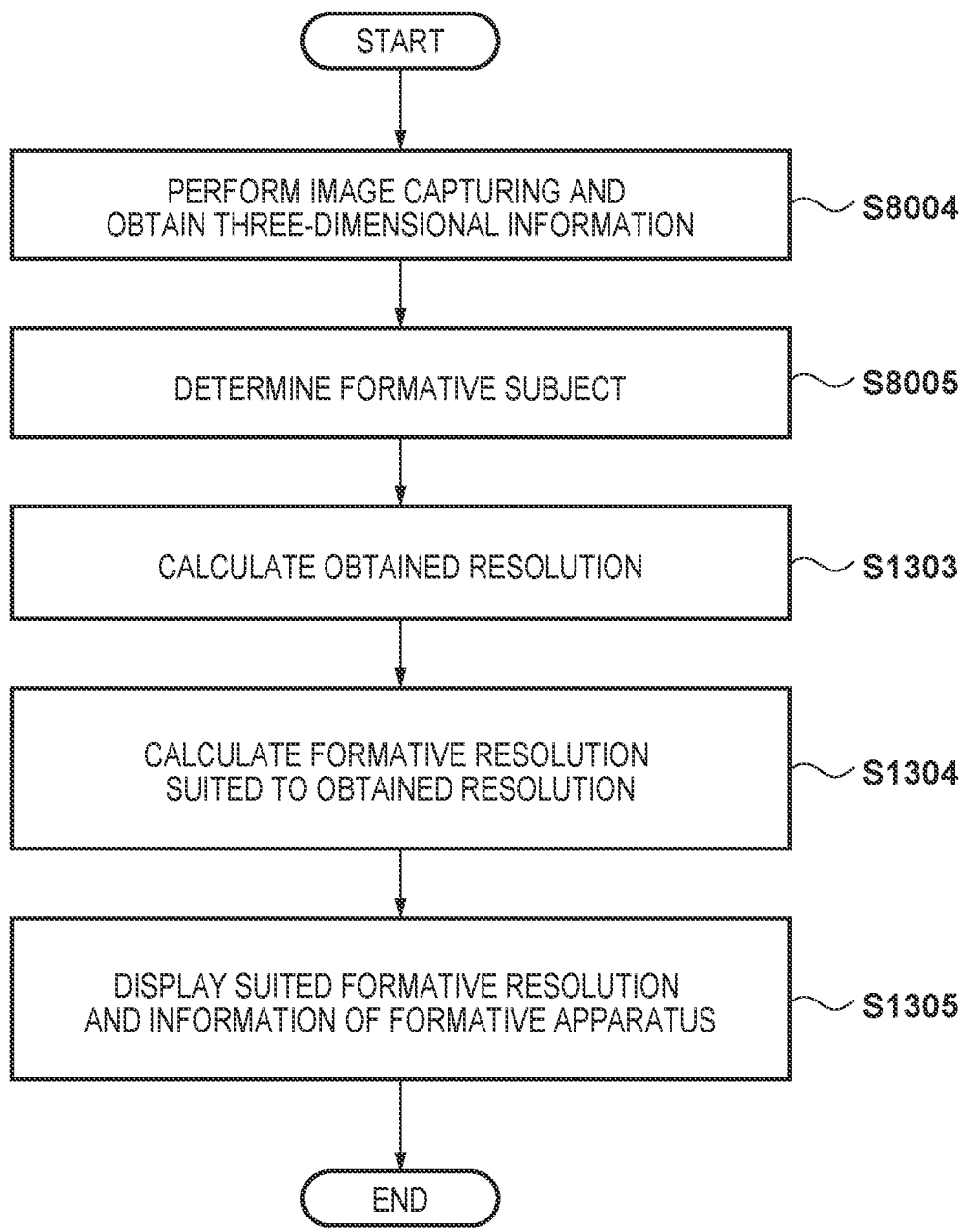
FIG. 15 is a flowchart showing three-dimensional information obtaining operations according to the second embodiment.

Next, with reference to the flowchart shown in FIG. 15, a description is given of three-dimensional information obtaining operations performed by the camera 1. Note that steps in which the same operations are performed as in the first embodiment are given the same reference numerals, and redundant descriptions are omitted.

In step S8004, the camera 1 performs image capturing in response to the instruction to start image capturing, and obtains three-dimensional information by using the three-dimensional information obtaining unit 12. In step S8005, the subject from which a three-dimensional object is formed is determined. In step S1303, the system control unit 3 calculates the obtained resolution from the information corresponding to the area of the subject determined in step S8005, which is included in the three-dimensional information obtained in step S8004, and stores the obtained resolution to the obtained resolution storage unit 13. The method for calculating the obtained resolution is the same as that in the first embodiment.

In step S1304, the system control unit 3 calculates an appropriate formative resolution according to Expression (5) from the obtained resolution and the formative magnification ratio that has been input via the formative magnification ratio input unit 10.

In step S1305, the system control unit 3 notifies the user of the formative resolution suited to the obtained resolution, or of information specifying a formative apparatus that has a formative resolution suited to the obtained resolution. In the former case, the system control unit 3 notifies the user of the formative resolution calculated in step S1304 by using, for example, the display unit 15 as shown in FIG. 14A.

On the other hand, in the latter case, the system control unit 3 provides the formative resolution calculated in step S1304 to the comparison unit 14. The comparison unit 14 refers to data indicating a plurality of formative resolutions, which is stored in the formative resolution storage unit 11, and searches for a formative apparatus that supports a formative resolution that is equal to or higher than the formative resolution obtained from the system control unit 3, and returns the search result to the system control unit 3. The system control unit 3 notifies the user of information of the formative apparatus obtained from the comparison unit 14 by using, for example, the display unit 15 as shown in FIG. 14B.

Note that the method for generating the ultimate formative data from the three-dimensional information obtained in step S8004 may be the same as that in the first embodiment. When obtaining comprehensive three-dimensional information, the user can obtain formative data having a resolution suited to a particular formative apparatus by capturing an image of the subject a plurality of times from different directions such that the formative resolution that the user is notified of in step S1305 is the same at every time of image capturing.

As described above, according to the present embodiment, the user can easily know a formative resolution or a formative apparatus that is suited to reproducing the resolution of the three-dimensional information obtained by the camera 1. Therefore, the user can easily obtain three-dimensional information suited to a desired apparatus by using a camera.

Third Embodiment

Figure 16:
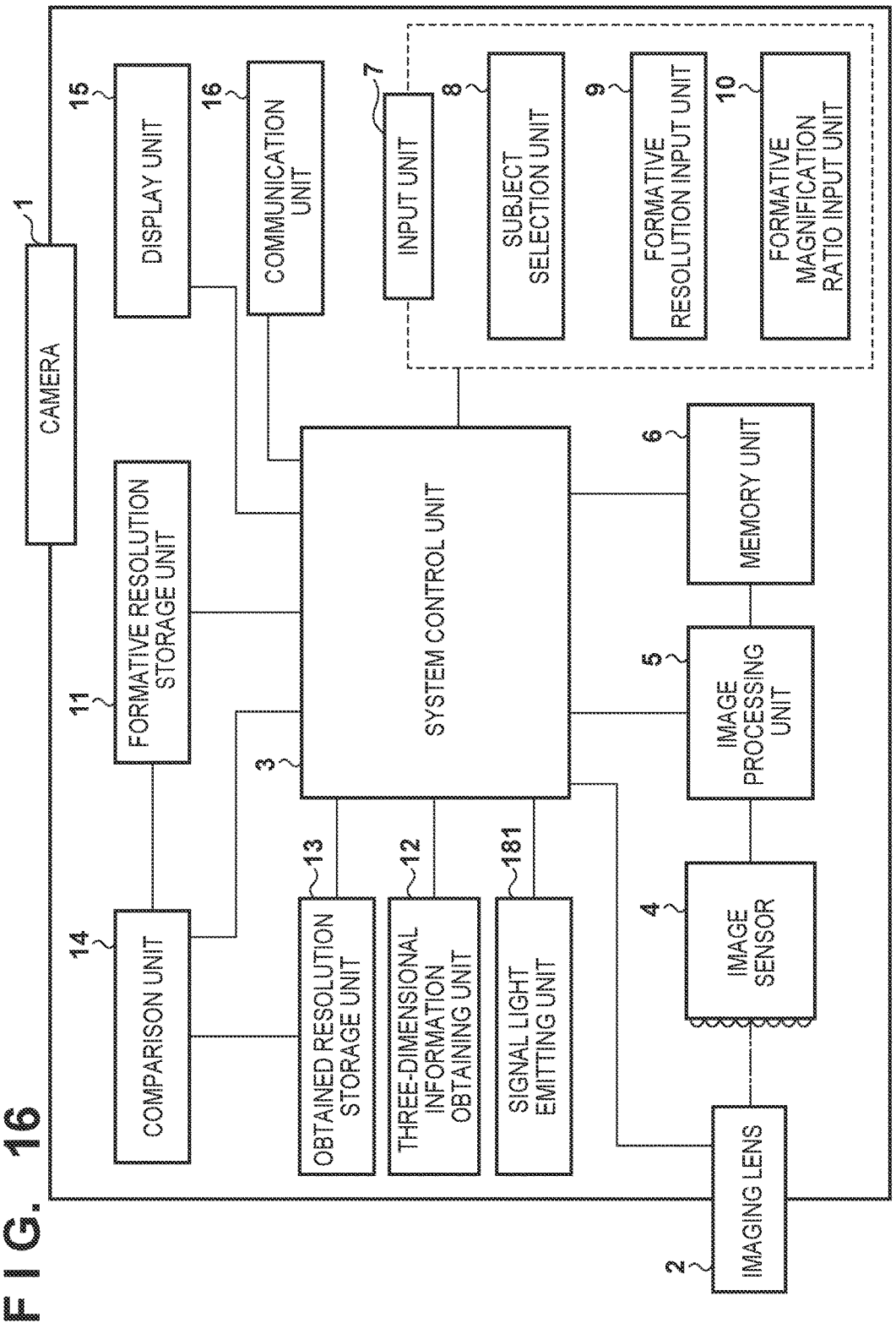
FIG. 16 is a block diagram showing an example of a functional configuration of a camera according to a third embodiment.

Next, a description is given of a third embodiment of the present invention. FIG. 16 is a block diagram showing an example of a functional configuration of a digital camera (hereinafter simply referred to as a camera) 1, which is an example of an image capture apparatus according to a third embodiment of the present invention. The camera 1 according to the present embodiment has the same functional configuration as the camera 1 shown in FIG. 1, except for having a signal light emitting unit 181. The camera 1 according to the present embodiment calculates the distance from each pixel to the subject based on the period until light emitted by the signal light emitting unit 181 is received by the image sensor 4.

The signal light emitting unit 181 emits signal light having a constant wavelength, such as infrared light or laser light, to the subject, and receives reflected light by using the image sensor 4. The three-dimensional information obtaining unit 12 calculates the distance from each pixel to the subject, namely the three-dimensional information, based on the elapsed time from the time at which signal light is emitted from the signal light emitting unit 181 until the time at which the corresponding pixel of the image sensor 4 receives the light, and the speed of the signal light.

Figure 17:
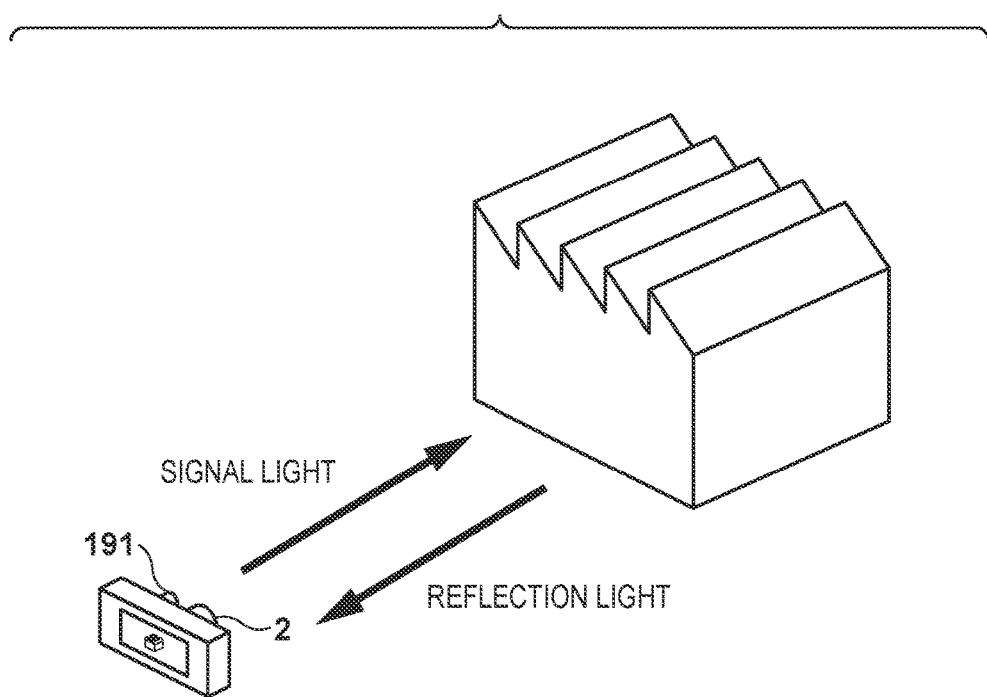
FIG. 17 is a diagram schematically showing the situation at the time of obtaining three-dimensional information according to the third embodiment.

FIG. 17 is a diagram schematically showing the situation at the time of obtaining the three-dimensional information according to the present embodiment. 191 represents an infrared light LED that emits signal light, and that corresponds to the signal light emitting unit 181. Although an infrared light LED is used as the signal light emitting unit 181 in FIG. 17, any other kinds of signal light having a known wavelength may be used. In the image sensor 4, each pixel receives light via the imaging lens 2, and thus the three-dimensional information at each pixel is obtained. As described above, in the present embodiment, the three-dimensional information at each pixel is obtained and recorded to the memory unit 6 together with the captured image. The subsequent operations to be performed are the same as those in the first embodiment and the second embodiment. Also, regarding data processing for obtaining formative data from the three-dimensional information as described for FIG. 12, step S1601 is not performed in the present embodiment, and processing starts from step S1602.

As described above, according to the present embodiment, with an image capture apparatus that can calculate the three-dimensional information of the subject within an image by emitting signal light and obtaining reflected light, a judgment is made as to whether or not the calculated three-dimensional information has a resolution that is suited for use by the formative apparatus. Therefore, in the case where it is judged that the resolution of the three-dimensional information is insufficient, the image capture apparatus can prompt the user to recapture an image under shooting conditions that will improve the resolution, or automatically determine shooting conditions that will improve the resolution, and thus can aid in obtaining the desired three-dimensional information that is suited to the formative apparatus.

Other Embodiments

In the embodiments above, the operations of the comparison unit 14 may be performed by the system control unit 3. Also, at least either the formative resolution storage unit 11 or the obtained resolution storage unit 13 may be a storage area within the memory unit 6.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-252295, filed on Dec. 12, 2014, which is hereby incorporated by reference herein in its entirety.

What is claimed is:

1. An image capture apparatus, comprising:
an image sensor;
an obtaining unit configured to obtain three-dimensional information of a subject, the three-dimensional information including an image obtained by using the image sensor, and depth information relating to the image;
a comparison unit configured to make a comparison between a resolution of the three-dimensional information and a resolution of a formative apparatus; and
a judging unit configured to judge whether or not recapturing of the subject is required, based on a result of the comparison,
wherein the obtaining unit obtains three-dimensional information relating to each pixel position, based on a defocus amount at each pixel position obtained based on parallax images, and
the judging unit judges that recapturing is required when a maximum value of a distance between the three-dimensional information of adjacent pixel positions is greater than or equal to the resolution of the formative apparatus.

2. The image capture apparatus according to claim 1, wherein the predetermined resolution is set by a user.

3. The image capture apparatus according to claim 1, further comprising a notification unit configured to notify a user that recapturing has been judged to be required.

4. The image capture apparatus according to claim 3, wherein the notification unit further notifies a user of information indicating a method for increasing the resolution of the three-dimensional information.

5. The image capture apparatus according to claim 1, further comprising a determination unit configured to, when recapturing has been judged to be required, automatically determine shooting conditions for recapturing so as to improve the resolution of the three-dimensional information that is to be obtained by the obtaining unit from parallax images obtained by recapturing.

6. The image capture apparatus according to claim 5, wherein the determination unit determines the shooting conditions for recapturing so as to increase a focal distance of an imaging optical system or a captured image size.

7. The image capture apparatus according to claim 1, wherein the judging unit judges that recapturing is required when a product of the resolution of the three-dimensional information and a formative magnification ratio is equal to or smaller than a resolution of a formative apparatus.

8. The image capture apparatus according to claim 1, wherein the resolution of the three-dimensional information is obtained from a focal distance of an imaging optical system that has obtained parallax images, a pixel pitch of the image sensor, and a subject distance included in the three-dimensional information.

9. The image capture apparatus according to claim 1, wherein each pixel of the image sensor has a plurality of photoelectric conversion areas, and parallax ages are obtained by exposing the image sensor a single time.

10. An image capture apparatus control method, comprising:
obtaining, based on parallax images obtained by using an image sensor, three-dimensional information of a subject included in the parallax images;
making a comparison between a resolution of the three-dimensional information and a resolution of a formative apparatus; and
judging whether or not recapturing is required, based on a result of the comparison,
wherein the obtaining obtains three-dimensional information relating to each pixel position, based on a defocus amount at each pixel position obtained based on the parallax images, and
the judging judges that recapturing is required when a maximum value of a distance between the three-dimensional information of adjacent pixel positions is greater than or equal to the resolution of the formative apparatus.

11. An image capture apparatus control method, comprising:
obtaining three-dimensional information of a subject, the three-dimensional information including an image obtained by using an image sensor, and depth information relating to the image;
making a comparison between a resolution of the three-dimensional information and a resolution of a formative apparatus; and
judging whether or not recapturing of the subject is required, based on a result of the comparison,
wherein the obtaining obtains three-dimensional information relating to each pixel position, based on a defocus amount at each pixel position obtained based on parallax images, and
the judging judges that recapturing is required when a maximum value of a distance between the three-dimensional information of adjacent pixel positions is greater than or equal to the resolution of the formative apparatus.

* * * * *